US011283746B1

(12) United States Patent
Munukutla et al.

(10) Patent No.: US 11,283,746 B1
(45) Date of Patent: Mar. 22, 2022

(54) MULTIPLE MESSAGE COMPOSITION USING ACTIONABLE TAGS

(71) Applicant: Microsoft Technology Licensing, LLC, Redmond, WA (US)

(72) Inventors: Venkata Satya Surya Subrahmanya Praveen Munukutla, Hyderabad (IN); Poorva Dharmadhikari, Indore (IN); Aditi Maheshwari, Jaipur (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/358,456

(22) Filed: Jun. 25, 2021

(51) Int. Cl.
| | | |
|---|---|---|
| *H04L 12/58* | (2006.01) | |
| *G06F 40/205* | (2020.01) | |
| *H04L 51/18* | (2022.01) | |
| *H04L 51/224* | (2022.01) | |
| *H04L 51/063* | (2022.01) | |
| *H04L 51/08* | (2022.01) | |

(52) U.S. Cl.
CPC ............ *H04L 51/18* (2013.01); *G06F 40/205* (2020.01); *H04L 51/063* (2013.01); *H04L 51/08* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 6,192,396 B1 * | 2/2001 | Kohler | ................. | G06Q 10/107 707/999.005 |
| 6,529,942 B1 * | 3/2003 | Gilbert | ................ | H04L 12/1886 709/206 |
| 8,543,656 B2 * | 9/2013 | Khoo | ................... | G06Q 10/107 709/206 |
| 8,799,379 B1 * | 8/2014 | Liden | ................... | G06Q 10/107 709/206 |
| 8,843,568 B2 * | 9/2014 | Vitaldevara | ............. | H04L 51/12 709/206 |
| 9,069,899 B2 * | 6/2015 | Bragdon | ............. | G06F 11/3664 |

(Continued)

OTHER PUBLICATIONS

Simpson, Calum, "Do You Know How to Add or Remove Someone from the Conversation?", Retrieved From https://www.ssw.com.au/rules/do-you-know-how-to-add-or-remove-someone-from-the-conversation, Apr. 1, 2021, 4 Pages.

(Continued)

*Primary Examiner* — Backhean Tiv
(74) *Attorney, Agent, or Firm* — Schwegman Lundberg & Woessner, P.A.

(57) ABSTRACT

Systems and techniques for multiple message composition using actionable tags are described herein. Message content is be received from a messaging client user interface. An actionable tag indicator is identified by parsing a body of the message content. An actionable tag is be generated based on the identified actionable tag indicator. The generated actionable tag includes the actionable tag indicator, a recipient identifier, and content. A first message may be automatically composed that includes the message content. A second message may be automatically composed that includes the message content and the actionable tag. The first message may be transmitted to at least one recipient and the second message may be transmitted a tagged recipient associated with the recipient identifier corresponding to the actionable tag.

20 Claims, 23 Drawing Sheets

(56) References Cited

U.S. PATENT DOCUMENTS

| | | | | |
|---|---|---|---|---|
| 9,176,945 | B1* | 11/2015 | Berner | G06F 40/186 |
| 9,558,270 | B2* | 1/2017 | Hanses | G06F 16/38 |
| 10,230,675 | B2* | 3/2019 | Mahood | H04L 51/00 |
| 10,491,552 | B2 | 11/2019 | Subramani et al. | |
| 2004/0078595 | A1* | 4/2004 | Kent, Jr. | H04L 63/0428 |
| | | | | 713/160 |
| 2007/0174398 | A1* | 7/2007 | Addante | H04L 51/14 |
| | | | | 709/206 |
| 2009/0013047 | A1* | 1/2009 | Adreon | G06Q 10/10 |
| | | | | 709/206 |
| 2011/0191428 | A1* | 8/2011 | Nairn | H04L 51/28 |
| | | | | 709/206 |
| 2011/0208820 | A1* | 8/2011 | Bitties | G06F 9/541 |
| | | | | 709/206 |
| 2011/0282948 | A1* | 11/2011 | Vitaldevara | H04L 51/12 |
| | | | | 709/206 |
| 2013/0080554 | A1* | 3/2013 | Addante | H04L 51/14 |
| | | | | 709/206 |
| 2013/0262590 | A1* | 10/2013 | Patil | G06Q 10/107 |
| | | | | 709/206 |
| 2015/0120680 | A1* | 4/2015 | Alonso | G06F 16/9535 |
| | | | | 707/692 |
| 2015/0341304 | A1* | 11/2015 | Sherman | H04L 67/306 |
| | | | | 709/206 |
| 2016/0021053 | A1* | 1/2016 | Bastide | H04L 51/32 |
| | | | | 709/206 |
| 2016/0164819 | A1* | 6/2016 | Shrivastava | H04L 63/10 |
| | | | | 709/206 |
| 2016/0255024 | A1* | 9/2016 | Tichauer | H04L 51/26 |
| | | | | 709/206 |
| 2016/0269334 | A1* | 9/2016 | DeSouza Sana | G06Q 10/107 |
| 2016/0286028 | A1* | 9/2016 | Ahuja | G06F 3/0488 |
| 2017/0214645 | A1* | 7/2017 | Berkow | H04L 51/18 |
| 2018/0107747 | A1* | 4/2018 | Bastide | G06F 16/24534 |
| 2021/0064692 | A1* | 3/2021 | Srinivasan | G06F 16/9566 |

OTHER PUBLICATIONS

Willo, "Using a Flow to Extract Email Body Details", Retrieved From https://powerusers.microsoft.com/t5/General-Power-Automate/Using-a-flow-to-extract-email-body-details/td-p/149186, Aug. 8, 2018, 16 Pages.

Johnson, Joseph, "Number of E-mails Per Day Worldwide 2017-2025" Retrieved From https://www.statistica.com/statistics/456500/daily-number-of-e-mails-worldwide/, Apr. 7, 2021, 2 Pages.

Specht, Bettina, "[infographic] The 2019 Email Client Market Share", Retrieved From https://www.litmus.com/blog/infographic-the-2019-email-client-market-share/, Jul. 8, 2019, 13 Pages.

"Outlook.com", Retrieved From https://web.archive.org/web/20210402235431/https://en.wikipedia.org/wiki/Outlook.com, Apr. 2, 2021, 16 Pages.

* cited by examiner

405

Common Message Received

File · Help

Message

Regarding Crawled Properties Creation - Message (HTML)   Search

Share to Teams | Mark Unread | ⋮⋮ > | ⊞ > | ⊞ > | Find | 🔍 > | Zoom

Regarding Properties Creation

To  ⊘Mary  ○Jennifer  ○James  ⊘Susan

General

Let's all meet tomorrow to discuss any further changes on this one

Thanks,
John.

From: Susan <susan.lie@company.com>
Sent: Wednesday, March 31, 2021 1:00 PM
To: John<john@company.com>, Jennifer<jennifer@company.com>, Mary<mary@company.com>,
Cc: James<james@company.com>
Subject: Regarding Properties Creation.

Hi John,

Properties are only created by the widget. Classic admin cannot create any widget property.

~Susan Lie.

Personal Message Received with Blue Tag

| File | Message | Help |

Regarding Crawled Properties Creation - Message (HTML)    Search

↑ ↶ ↷ → ▽     Share to Teams  |  ✉ Mark Unread    ⊞⊞ ˅   ♙ ˅   🗐 ˅  |  🔍 Find  | 🔤 ˅ | 🔍 Zoom

Regarding Properties Creation

To ⊚Susan  ○James  ○Jennifer  ⊚Mary
⊚General

Personal@Susan {
I am Facing some errors while implementing.
Can we guys sync later today to solve those errors?}
Let's all meet tomorrow to discuss any further changes on this one Thanks,
John.

From: Susan <susan.lie@company.com>
Sent: Wednesday, March 31, 2021 1:00 PM
To: John<john@company.com>, Jennifer<jennifer@company.com>, Mary<mary@company.com>;
Cc: James<james@company.com>
Subject: Regarding Properties Creation.

Hi John,

Properties are only created by the widget. Classic admin cannot create any widget property.

~Susan Lie.

File | Message | Help

▢ ▾ | 🗑 ▾ | ⬅ ↻ | 🖆 Share to Teams | ✉ Mark Unread | 🔲 ▾ | 🗐 ▾ | 🖼 ▾ | 🔍 Find | 🗣 ▾ | 🔍 Zoom

Regarding Properties Creation

JJ V S S S John Jones
To: ⊙Jennifer; ⊙Mary ⊙Susan; ⊙James
🏷 General

| #Remove.@James,@Susan {Thanks for your clarifications.} |

Let's all sync up tomorrow to finalize the design spec.

Thanks,
John.

---

From: Susan <susan.lie@company.com>
Sent: Wednesday, March 31, 2021 1:00 PM
To: John<john@company.com>, Jennifer<jennifer@company.com>, Mary<mary@company.com>,
Cc: James<james@company.com>
Subject: Regarding Properties Creation.

Hi John,

Properties are only created by the widget. Classic admin cannot create any widget property.

~Susan Lie.

Mail View from John's Sent Box
*FIG. 5B*

Regarding Properties Creation

To: ○Jennifer;  ⊙Mary
General | John Removed Susan & James from this Thread

Let's all sync up tomorrow to finalize the design spec.

Thanks,
John.

---

From: Susan <susan.lie@company.com>
Sent: Wednesday, March 31, 2021 1:00 PM
To: John<john@company.com>, Jennifer<jennifer@company.com>, Mary<mary@company.com>,
Cc: James<james@company.com>
Subject: Regarding Properties Creation.

Hi John,

Properties are only created by the widget. Classic admin cannot create any widget property.

~Susan Lie.

Mail View from Jennifer's Inbox

*FIG. 5C*

Callouts:
- 510
- Details Regarding who are Removed from the Thread.
- Receives Common Message Sent to Rest of the Users

Regarding Properties Creation

To: ⊙Mary  ○Jennifer

⊙General  John Removed Susan & James from this Thread

Let's all sync up tomorrow to finalize the design spec.

Thanks,
John.

From: Susan <susan.lie@company.com>
Sent: Wednesday, March 31, 2021 1:00 PM
To: John<john@company.com>, Jennifer<jennifer@company.com>, Mary<mary@company.com>,
Cc: James<james@company.com>
Subject: Regarding Properties Creation.

Hi John,

Properties are only created by the widget. Classic admin cannot create any widget property.

~Susan Lie.

— 515

Details Regarding who are Removed from the Thread.

Receives Common Message Sent to Rest of the Users

Mail View from Mary's Inbox

Mail View from James' Inbox

↙ 525

Details Regarding who Ended the Thread.

Receives Only Removal Message

File  Message  Help

▸ Regarding Crawled Properties Creation - Message (HTML)    Search

🖴 ▾ | 🗂 ▾ | ↶ ↷ → | 🖻 Share to Teams | ✉ Mark Unread | 🔳 ▾ | 🏷 ▾ | 🔎 Find | 🔁 ▾ | 🔍 Zoom

Regarding Properties Creation

To ⊙Susan

⦿ General | John Ended this thread with a message

Remove.@James,@Susan {Thanks for your clarifications.}

Thanks,
John.

From: Susan <susan.lie@company.com>
Sent: Wednesday, March 31, 2021 1:00 PM
To: John<john@company.com>, Jennifer<jennifer@company.com>, Mary<mary@company.com>,
Cc: James<james@company.com>
Subject: Regarding Properties Creation.

Hi John,

Properties are only created by the widget. Classic admin cannot create any widget property.

~Susan Lie.

Mail View from Susan's Inbox

Personal Comment to Paul from John, Which is Visible Only to Paul.

V S S S John Jones

Personal.@Paul {
What is XYZ?
Can you Expand the Acronym ?}

Search (Alt + Q)

Normal | No Spacing | Heading 1 | Heading 2 | Heading 3

Find ▾ | Reuse Fi

The quick, brown fox jumps over a lazy dog. DJs flock by when MTV ax quiz prog. Junk MTV quiz graced by fox whelps. Bawds jog, flick quartz, vex nymphs. Waltz, bad nymph, for quick jigs vex! Fox nymphs grab quick-jived waltz. Brick quiz whangs jumpy veldt fox. Bright vixens jump; dozy fowl quack. Quick wafting zephyrs vex bold Jim. Quick zephyrs blow, vexing daft Jim. Sex-charged fop blew my junk TV quiz. How quickly daft jumping zebras vex. Two driven jocks help fax my big quiz. Quick, Baz, get my woven flax jodhpurs! "Now fax quiz Jack!" my brave ghost pled. Five quacking zephyrs jolt my wax bed. Flummoxed by job, kvetching W. zaps Iraq. Cozy sphinx waves quart jug of bad milk. A very bad quack might jinx zippy fowls. Few quips galvanized the mock jury box. Quick brown dogs jump over the lazy fox. The jay, pig, fox, zebra, and my wolves quack! Blowzy red vixens fight for a quick jump. Joaquin Phoenix was gazed by MTV for luck. A wizard's job is to vex chumps quickly in fog. Watch "Jeopardy!", Alex Trebek's fun TV quiz game. Woven silk pyjamas exchanged for blue quartz. Brawny gods just XYZ Level:

Quick, Baz, get my woven flax jodhpurs! "Now fax quiz Jack!" my brave ghost pled. Five quacking zephyrs jolt my wax bed. Flummoxed by job, kvetching W. zaps Iraq, Cozy sphinx waves quart jug of bad milk. A very bad quack might jinx zippy fowls. Few quips galvanized the mock jury box. Quick brown dogs jump over the lazy fox.

705

Doc View for Paul.
Only He Can View Comment from John

| ≡ ∨ ≡ ≡ ∨ | Normal | No Spacing | Heading 1 | Heading 2 | Heading 3 | |
|---|---|---|---|---|---|---|

Search (Alt + Q)

Find ∨  Reuse F

The quick, brown fox jumps over a lazy dog. DJs flock by when MTV ax quiz prog. Junk MTV quiz graced by fox whelps. Bawds jog, flick quartz, vex nymphs. Waltz, bad nymph, for quick jigs vex! Fox nymphs grab quick-jived waltz. Brick quiz whangs jumpy veldt fox. Bright vixens jump; dozy fowl quack. Quick wafting zephyrs vex bold Jim. Quick zephyrs blow, vexing daft Jim. Sex-charged fop blew my junk TV quiz. How quickly daft jumping zebras vex. Two driven jocks help fax my big quiz. Quick, Baz, get my woven flax jodhpurs! "Now fax quiz Jack!" my brave ghost pled. Five quacking zephyrs jolt my wax bed. Flummoxed by job, kvetching W. zaps Iraq. Cozy sphinx waves quart jug of bad milk. A very bad quack might jinx zippy fowls. Few quips galvanized the mock jury box. Quick brown dogs jump over the lazy fox. The jay, pig, fox, zebra, and my wolves quack! Blowzy red vixens fight for a quick jump. Joaquin Phoenix was gazed by MTV for luck. A wizard's job is to vex chumps quickly in fog. Watch "Jeopardy!", Alex Trebek's fun TV quiz game. Woven silk pyjamas exchanged for blue quartz. Brawny gods just XYZ Level:

Quick, Baz, get my woven flax jodhpurs! "Now fax quiz Jack!" my brave ghost pled. Five quacking zephyrs jolt my wax bed. Flummoxed by job, kvetching W. zaps Iraq. Cozy sphinx waves quart jug of bad milk. A very bad quack might jinx zippy fowls. Few quips galvanized the mock jury box. Quick brown dogs jump over the lazy fox.

V S S S John Jones   ...
What is OOTB ? Can you Expand the Acronym ?
April 1,2021, 12:52 PM
@Mention or Reply

Doc View for Others.

They Can't View Comments from John

| ≡ ≡ ≡ ≡ > | ⌕ Search (Alt + Q) | | | | |
|---|---|---|---|---|---|
| | Normal | No Spacing | Heading 1 | Heading 2 | Heading 3 > |
| | | | | ⌕ Find ⌄ | 🗎 Reuse Fi |

The quick, brown fox jumps over a lazy dog. DJs flock by when MTV ax quiz prog. Junk MTV quiz graced by fox whelps. Bawds jog, flick quartz, vex nymphs. Waltz, bad nymph, for quick jigs vex! Fox nymphs grab quick-jived waltz. Brick quiz whangs jumpy veldt fox. Bright vixens jump; dozy fowl quack. Quick wafting zephyrs vex bold Jim. Quick zephyrs blow, vexing daft Jim. Sex-charged fop blew my junk TV quiz. How quickly daft jumping zebras vex. Two driven jocks help fax my big quiz. Quick, Baz, get my woven flax jodhpurs! "Now fax quiz Jack!" my brave ghost pled. Five quacking zephyrs jolt my wax bed. Flummoxed by job, kvetching W. zaps Iraq. Cozy sphinx waves quart jug of bad milk. A very bad quack might jinx zippy fowls. Few quips galvanized the mock jury box. Quick brown dogs jump over the lazy fox. The jay, pig, fox, zebra, and my wolves quack! Blowzy red vixens fight for a quick jump. Joaquin Phoenix was gazed by MTV for luck. A wizard's job is to vex chumps quickly in fog. Watch "Jeopardy!", Alex Trebek's fun TV quiz game. Woven silk pyjamas exchanged for blue quartz. Brawny gods just XYZ Level:

Quick, Baz, get my woven flax jodhpurs! "Now fax quiz Jack!" my brave ghost pled. Five quacking zephyrs jolt my wax bed. Flummoxed by job, kvetching W. zaps Iraq. Cozy sphinx waves quart jug of bad milk. A very bad quack might jinx zippy fowls. Few quips galvanized the mock jury box. Quick brown dogs jump over the lazy fox.

*FIG. 7C*

MULTIPLE MESSAGE COMPOSITION USING ACTIONABLE TAGS

CLAIM OF PRIORITY

The present patent application claims the priority benefit of the filing date of Indian Application No. 202141024275 filed May 31, 2021, the entire content of which is incorporated herein by reference.

TECHNICAL FIELD

Embodiments described herein generally relate to electronic messaging and, in some embodiments, more specifically to multiple message composition using in-line actionable tags.

BACKGROUND

The average worker spends twenty-eight percent of their work week on email. That amounts to more than eleven hours a week. The average person needs twenty-three minutes to get fully back on task after an interruption. That is nearly another two hours not spent on email itself but spent on interruptions. In total, reading, writing, and getting refocused after checking email may cost a user up to 1,048 hours each year. This may amount to fifty-two percent of work hours. A user may desire to reduce email interruptions by reducing email clutter. Traditional techniques may clutter message stores, increase storage utilization, cost user time and effort, increase network traffic, and increase click counts for composing multiple messages. Context switching may be time consuming and distracting to the user. Increased processing cycles may be required for the computing device by increased menu activations and application and feature launch processes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4B illustrates an example of an electronic message client non-tagged recipient view for multiple message composition using actionable tags, according to an embodiment.

FIG. 4C illustrates an example of an electronic message client tagged recipient view for multiple message composition using actionable tags, according to an embodiment.

FIG. 4D illustrates an example of an electronic message client tagged recipient view for multiple message composition using actionable tags, according to an embodiment.

FIG. 5B illustrates an example of an electronic message client sender view of a sent message with a recipient removal tag for multiple message composition using actionable tags, according to an embodiment.

FIG. 5C illustrates an example of an electronic message client non-tagged recipient view for multiple message composition using actionable tags, according to an embodiment.

FIG. 5D illustrates an example of an electronic message client non-tagged recipient view for multiple message composition using actionable tags, according to an embodiment.

FIG. 5E illustrates an example of an electronic message client tagged recipient view for multiple message composition using actionable tags, according to an embodiment.

FIG. 5F illustrates an example of an electronic message client tagged recipient view for multiple message composition using actionable tags, according to an embodiment.

FIG. 6 illustrates an example of an electronic message client interface view that includes actionable tag management controls for multiple message composition using actionable tags, according to an embodiment.

FIG. 7A illustrates an example of a document editor view of a document with a comment that includes a personal message tag for multiple message composition using actionable tags, according to an embodiment.

FIG. 7B illustrates an example of a document editor view for a tagged recipient of a comment with a personal message tag for multiple message composition using actionable tags, according to an embodiment.

FIG. 7C illustrates an example of a document editor view for a non-tagged recipient of a comment with a personal message tag for multiple message composition using actionable tags, according to an embodiment.

DETAILED DESCRIPTION

Figure 1:
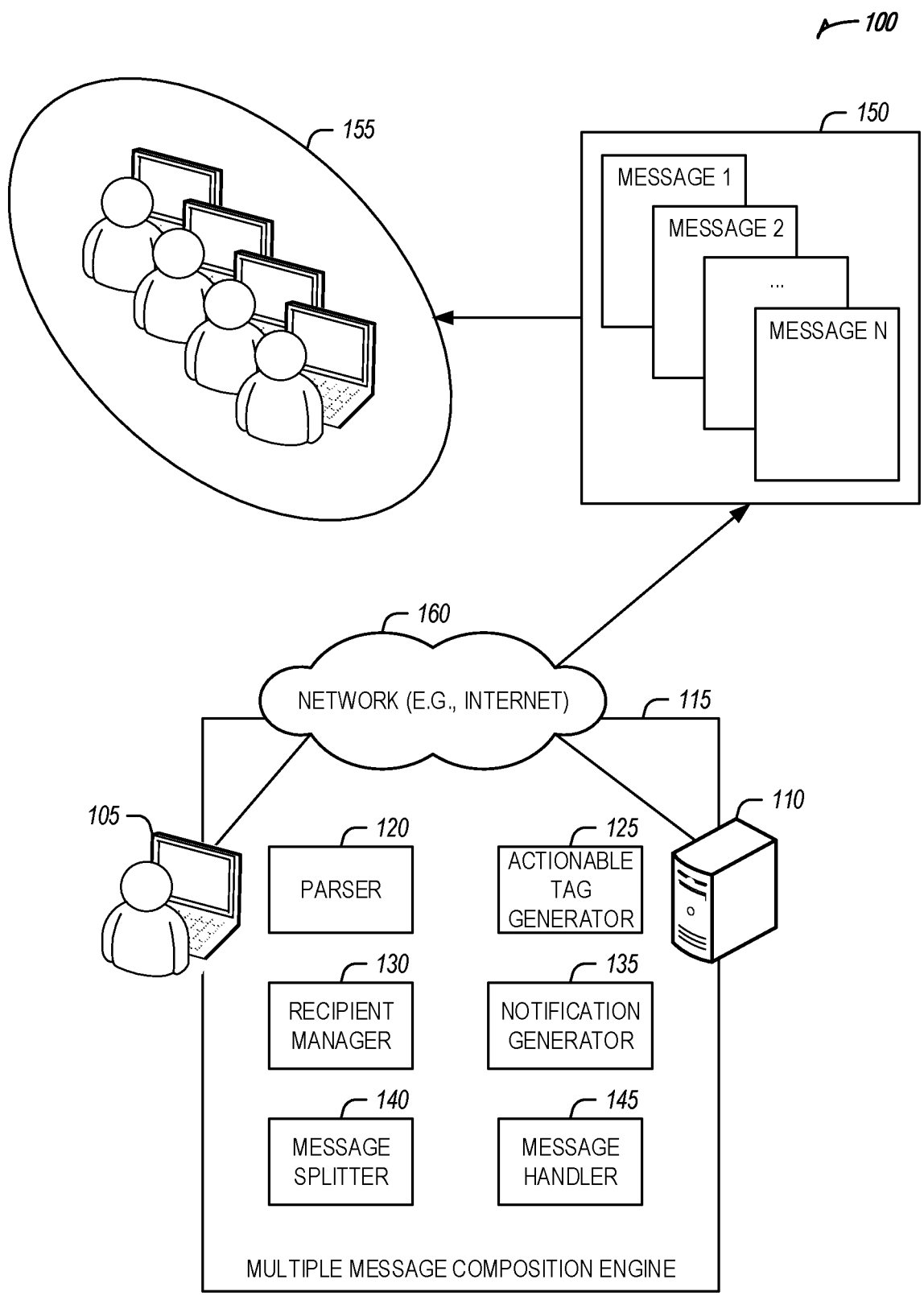
FIG. 1 is a block diagram of an example of an environment and a system for multiple message composition using actionable tags, according to an embodiment.

An increase in the volume of emails and docs results in a loss of relevant information or delays. Silos are created once a main mail chain is broken which creates confusion. This makes it difficult for a sender to track the mail chain and perform necessary action on documents. Most of a conversation chain may have different responses and actions for different recipients within or outside the conversation chain (e.g., message chain, chat stream, message stream, etc.). Providing responses or information that are not directed to specific recipients leads to redundant or unnecessary information being delivered to recipients leading to clutter. Clutter wastes time, effort, and energy in managing and keeping the conversation up to date for all the recipients resulting in more administrative overhead for the sender.

Conventional messaging delivers content that is meant for specific recipients to all recipients in a messaging chain. Thus, recipients may be responsible for filtering through message content to determine information that is relevant to them and information that is not relevant to them. In addition, the involvement of a recipient in a message chain may end without a good way to gracefully remove the recipient from the messaging chain. A recipient could be removed manually, but the recipient and other recipients may not realize that the recipient has been removed leading to confusion. Alternatively, the recipient may be retained in the messaging chain and may receive irrelevant information that clutters the messaging stream and may distract from relevant messages. Furthermore, information in the messaging chain may be cluttered together and be overlooked using traditional messaging techniques. It may also be difficult to distinguish content that is for consumption by all recipients from content that is specific to a particular recipient(s).

The systems and techniques discussed herein declutter message stores, save storage space, save user time and effort, reduce network traffic, and reduce click counts for composing multiple messages. A diversified message is composed using actionable tags that relay personal messages, provide graceful recipient removal, etc. Actionable tags are identified and interpreted by a messaging client (or a messaging server) and may trigger an action to be completed for content. For example, a user (e.g., a sender, etc.) may type a tag #Personal, recipient identifier(s), and content that may cause the messaging client to compose a personal message to a recipient(s). In another example, the user may type a tag #Remove and a recipient identifier(s) and that may cause a recipient(s) to be removed from the messaging chain when the message is sent while also composing a message to the removed recipient and remaining recipients indicating that the recipient was removed from the chain. The sender may also include content to be included with the removal message. All or some actionable tags may be maintained or removed in when messages are forwarded or in replies. In addition, a user may configure a messaging client for automatic actionable tag handling for forwards or replies. For example, a user may indicate that all tags should be removed when a message is forwarded while maintaining all tags when a reply message is sent. In an example, the messaging client may display actionable tags in color codes to increase readability and noticeability for the actionable tags and corresponding content.

FIG. 1 is a block diagram of an example of an environment 100 and a system 115 for multiple message composition using actionable tags, according to an embodiment. The environment 100 may include a messaging client running on a client device 105 (e.g., a computing device, a mobile computing device, a smartphone, a tablet, a web client, etc.), a messaging server 110 (e.g., an electronic mail server, a collaboration server, a chat server, etc.), and recipient messaging clients 155 operating on a variety of computing devices. The client device 105, the messaging server 110, and the recipient messaging clients 155 may be communicatively coupled via a network 160 (e.g., the internet, mobile network, local area network, wireless network, etc.).

The system 115 may include a variety of components including a parser 120, an actionable tag generator 125, a recipient manager 130, a notification generator 135, a message splitter 140, and a message handler 145. In an example, the system 115 may be a multiple message composition engine. The system 115 may be executing as a component of the messaging client running on the client device 105, the messaging server 110, a computing platform operating on the network 160, etc. The components of the system 115 may execute on a single computing device or components of the system may be executed by multiple computing devices. In an example, the system 115 may be implemented as software computing instructions executed by a hardware processor. In another example, the system 115 (or components of the system 115) may be implemented in hardware (e.g., in a field programmable gate array (FPGA), an application-specific integrated circuit (ASIC), system-on-chip (SoC), etc.).

The parser 120 parses message text (e.g., during composition, at message transmission, etc.) to identify tag indicators. For example, the parser 120 receives an input stream from a messaging client that includes arrays of characters created as the user enters text into a messaging user interface. The messaging user interface may be an email composition interface, a comment creation interface, a chat interface, and the like. The tag indicators provide an indication that a sender has included actionable instructions within a message. For example, a user may designate content for transmission to specific recipients, designate recipients to be added or removed from the recipient list, or provide other tags that indicate actions to be performed. For example, the user may include #Reminder to create a reminder, #Metting to schedule a meeting, #OOF to trigger a recipient availability display pop-up, #Translate to translate a message to be transmitted to a recipient, #Sign to include a basic signature to be included in a message transmitted to a recipient, #Greeting to set a custom greeting message to a recipient, #Merge returns a list of messages and the user may select messages to merge into a single message which will merge the messages and notify recipients that the messages have been merged, etc. For example, the #Translate tag is typed by a user and the user provides an indication of a language (e.g., Spanish, French, Russian, English, etc.) and a recipient to which a translated message is to be sent. For example, content may include the text "We will have a call to discuss this issue." and recipient Tina is specified to receive a translation in Spanish and the message that Tina receives may include the content "Tendremos una llamada para discutir este tema." The remaining recipients receive the message in the source language or another language if they are the subject of another #Translate actionable tag. Thus, the sender may designate, in-line, output languages for various recipients. Likewise, the recipient, when sending replies or forwards, may request that the message be translated back to the original language or another language before delivery to a recipient. In an example, languages of the recipients and senders are stored in a profile and a The tags are provided in-line with content of the message to reduce clicks (e.g., to select toolbar commands, etc.) or user actions (e.g., switching application modes, etc.) to be completed to perform an action.

Allowing the user to provide in-line tags for action items reduces context switching for the user which may be time consuming and distracting. In-line tag recognition also reduces processing cycles for the computing device by reducing menu activations and application and feature launch processes. For example, the user types #Personal in-line in the text with a recipient identifier (e.g., email address, handle, etc.) and content such as {Please call me about the new MX record for this site}. In the example, the curly braces (0) indicate the start and end of the content to be transmitted only to the recipient (or recipients) indicated by the recipient identifier. In another example, a sender may wish to remove a recipient from an email chain and my type #Remove with a recipient identifier and content. In yet another example, the user types #personal @poorva{#Greeting {Hope you're doing well} #todo{"review my code"} #}. A personal message is indicated by the #personal in the text to be transmitted to Poorva based on identification of the @poorva recipient identifier. The parser 120 identifies a greeting of "Hope you're doing well" based on the #Greeting tag and a to-do action of "Review My Code" is identified based on the #todo tag. Thus, tags are used in combination and may be used as short-hand for actions to be completed in generation of a message for transmission to a recipient.

The parser 120 detects the beginning of the content based on a start indicator and continues adding content to a buffer or other storage mechanism until an end indicator is reached. It will be understood that a variety of characters and techniques may be used for indicating the start and end of the personal content. When the end indicator is reached, the content from the buffer is added to message content to be transmitted to a corresponding recipient indicated by the recipient identifier.

The parser 120 identifies the tag identifiers and may work in conjunction with the actionable tag generator 125 to generate corresponding actionable tags. In an example, the actionable tags replace the content typed by the user. For example, the actionable tag generator generates a personal message box within the composition window of a messaging client in blue indicating that there is personal content to be transmitted to a recipient. The personal message box may include the actionable tag, the recipient identifier, the content, and controls for managing the actionable tag (e.g., a delete control, resizing control, placement control, etc.). In an example, when the parser 120 identifies an actionable tag, the actionable tag generator 125 creates an actionable tag bubble display element in the messaging user interface. The user is able to provide content within the bubble display element and the bounds (e.g., an array, a string, etc.) of a text entry element of the bubble display element defines the start and end of the content.

The recipient manager 130 adds and removes recipients from a message chain and maintains a list of recipients. For example, a personal message indicator is identified by the parser 120 for a recipient that is not currently in the recipient list. The recipient manager 130 adds the recipient of the personal message to the recipient list. The addition is triggered by detection of the tag identifier by the parser 120 or upon generation of the actionable tag by the actionable tag generator 125. The recipient manager 130 removes recipients from the recipient list in response to detection of or upon creation of a removal actionable tag.

The notification generator 135 generates notifications based on the actionable tags generated by the actionable tag generator. The notifications may include messages include content, removal notification messages for a removed recipient and other recipients, recipient addition notifications for recipients added to a message stream based as indicated by an actionable tag, and the like.

The message splitter 140 generates a set of individual messages 150 based on the message content destined for all recipients and the notifications generated by the notification generator 135. In an example, the message splitter 140 aggregates notifications for recipients to prevent multiple messages from being generated and transmitted to a recipient. For example, recipient Billie has been identified for a private message and a removal message. The message splitter 140 composes a message for Billie that includes an original message and any content to be received by all recipients, private content in actionable tags (e.g., in blue, etc.), and a removal notification (e.g., in red, etc.) indicating that Jane has removed Billie from the message thread. The recipient manager 130 removes Billie from the recipients list so that further messages are not transmitted to the messaging client of Billie. When the set of individual messages 150 are composed (e.g., all actionable tags have been processed, etc.), the message handler 145 transmits the messages to the messaging server 110 (or directly to the recipients, etc.).

The message splitter 140 generates a variety of messages that are to be transmitted to the recipients of the message. The message splitter 140 generates a default message that includes general content (e.g., content not associated with an actionable tag, etc.) included by the sender. If a recipient is not identified as the subject of any actionable tags, the message splitter 140 designates the default message for transmission to the recipient. In an example, the message splitter generates a recipient list for the default message that includes recipients that are not subjects of actionable tags. The message splitter 140 also adds recipients that have been associated with recipient addition tags to the list of recipients for the default message if they have been silently added and are not the subject of another actionable tag.

The message splitter 140 collates or otherwise aggregates actionable tags for each recipient into an array or other storage mechanism to generate messages for each recipient that is the subject of an actionable tag. The message splitter modifies the default message to insert the actionable tags for a recipient into a message to be sent to a particular recipient. The message splitter 140 generates messages in a variety of formats for transmission to a recipient. For example, the message splitter 140 may generate an electronic mail message, a meeting file (e.g., a .vcs file, .rtc file, .ics file, etc.), a task assignment object, a reminder object, etc. In an example, files and objects may be included in an email message to a recipient associated with the actionable tags from which the files and objects were generated. The notifications generated by the notification generator 135 are included in messages generated by the message splitter for transmission to recipients. For example, a removal notification is generated by the notification generator based on identification of a recipient removal tag identified in a message by the parser 120 and a corresponding recipient removal actionable tag generated by the actionable tag generator 125. The notification may include content indicating that a recipient associated with the actionable tag was removed by the sender. A notification is included in a message to be transmitted to the removed recipient and another (or the same) notification is transmitted to the other recipients of the message stream.

The message splitter 140 transmits the messages to a message handler 145. The message handler 145 transmits the messages directly to recipients for delivery or may transmit the messages to a messaging system for subsequent delivery to the recipients. The message handler 145 may be a component of an electronic mail server, collaboration server, project management server, or other server that works within a platform for message exchange between users.

A messaging client enabled for multiple message composition using actionable tags may include a personalized configuration element that allows a user to provide preferences for actionable tag handling. For example, an email client may include a tag configuration icon within a settings and personalization control panel. Personalization may include automatically deleting (or maintaining) actionable tag in forwarded messages or reply messages, customized actionable tag definitions and associated actions, alternate symbols to be used for indicating a tag, shortcuts for tags (e.g., #TD for #todo, etc.), etc. The parser 120, the actionable tag generator 125, the recipient manager 130, the notification generator 135, and the message splitter 140 may receive the customized configuration information and may modify operations based on the customizations provided. For example, the parser 120 may add or modify identifiers that are recognize actionable tags during parsing.

In an example, the message splitter 140 and the notification generator 135 may execute on the messaging server 110 and may receive general message content, actionable tags, nonactionable tags (e.g., actionable tags from previous messages), and corresponding recipients from the client device 105. Messages for recipients may be generated by the messaging server 110. In another example, the message splitter 140 and the notification generator 135 may execute within the messaging client executing on the client device 105. The messages for the recipients may be generated by the client device 105 and transmitted to the messaging server 110 for transmission to the recipient messaging clients 155. In an example, the messaging client of the client device 105 may transmit the messages for the recipients directly to the recipient messaging clients 155 without the transmitting messages to the messaging server 110. In yet another example, the system 115 may execute on the messaging server and the messaging may receive a message from the client device 105 and may parse the message and generate the messages for transmission to the recipient messaging clients 155. This is useful in situations where the client device 105 has limited computing resources or where network bandwidth is limited and transmission of text is preferable to dynamic content.

Figure 2A:
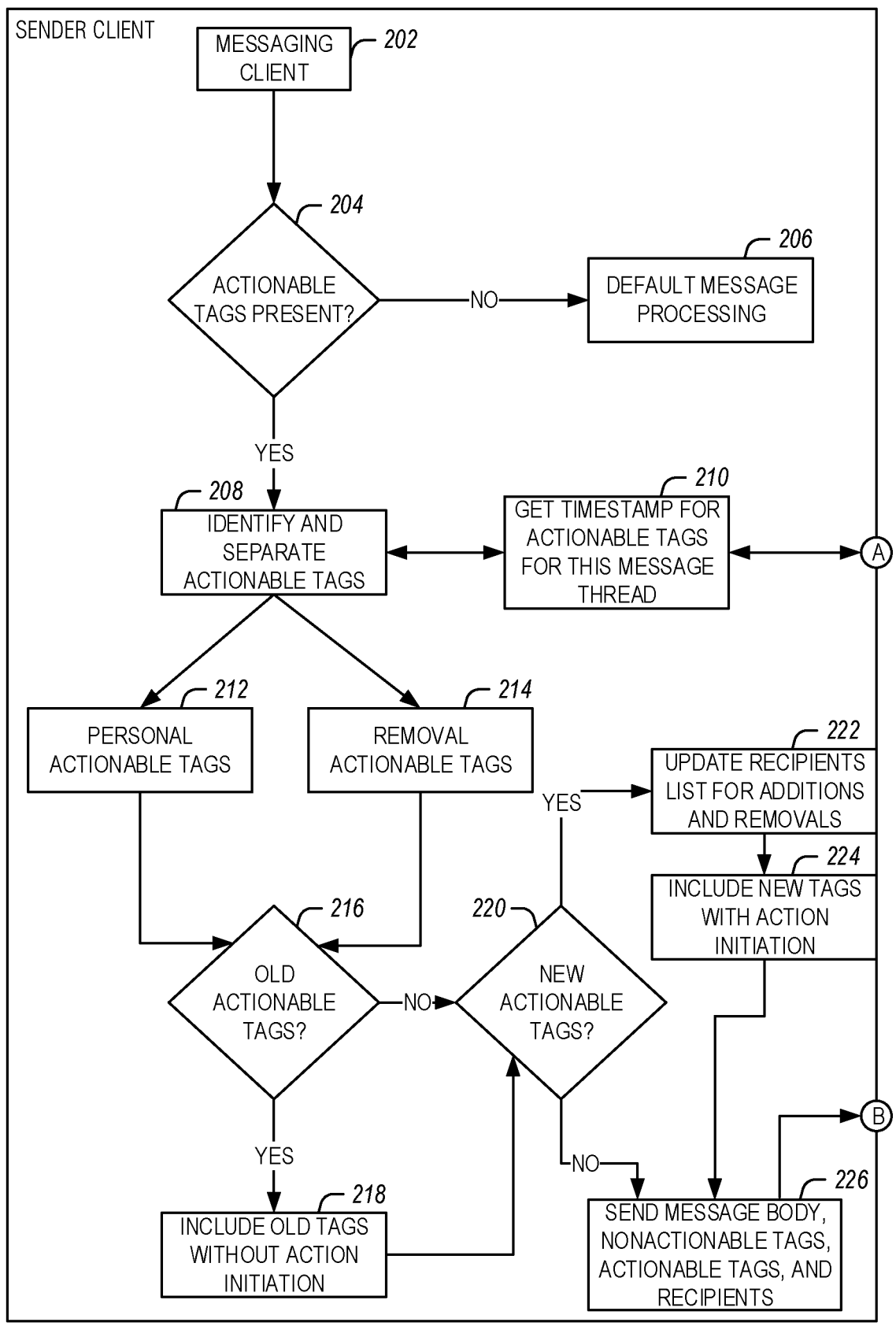
FIG. 2A illustrates a data flow diagram of an example of a process for a client for multiple message composition using actionable tags, according to an embodiment.
Figure 2B:
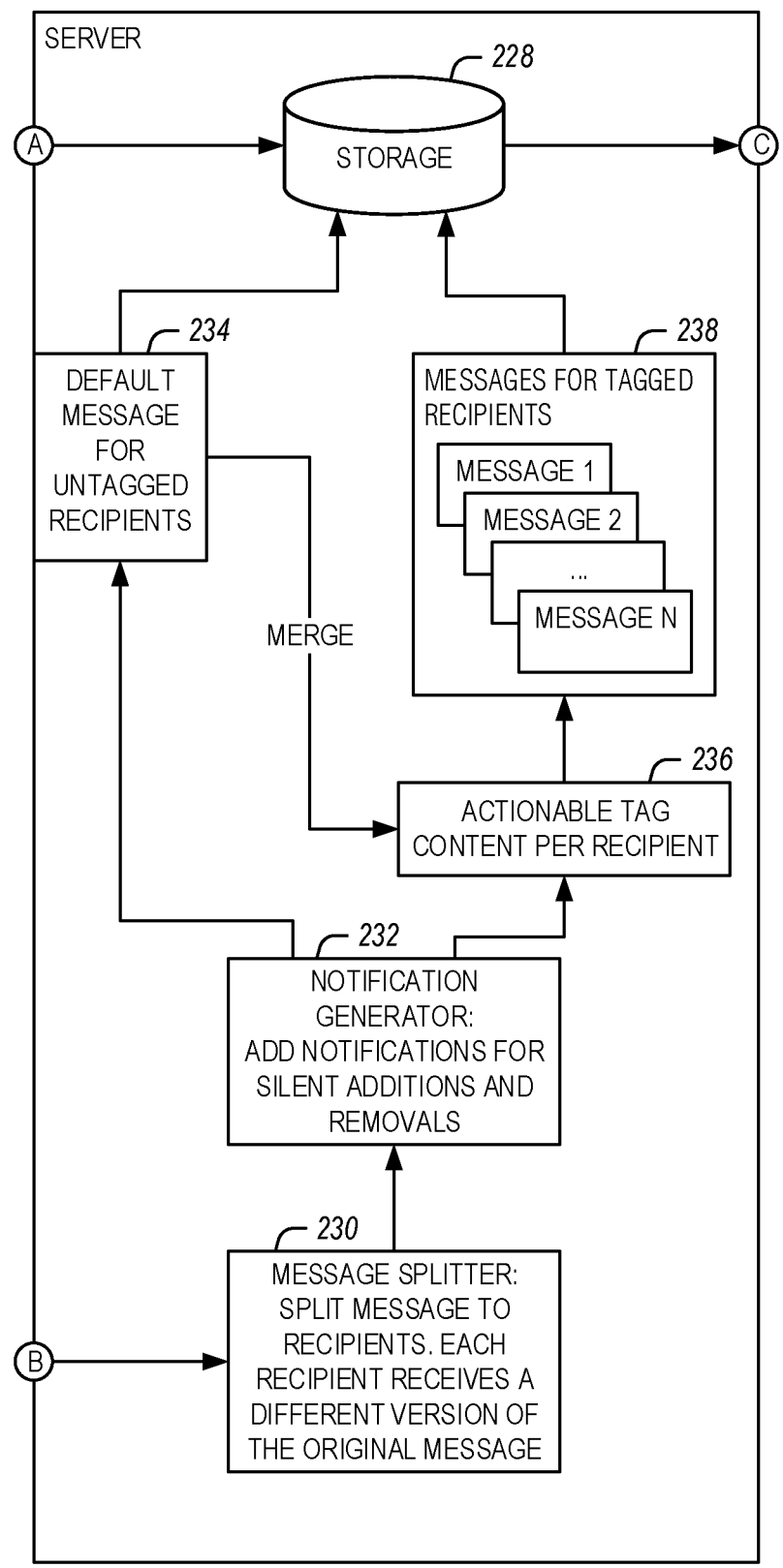
FIG. 2B illustrates a data flow diagram of an example of a process for a server for multiple message composition using actionable tags, according to an embodiment.
Figure 2C:
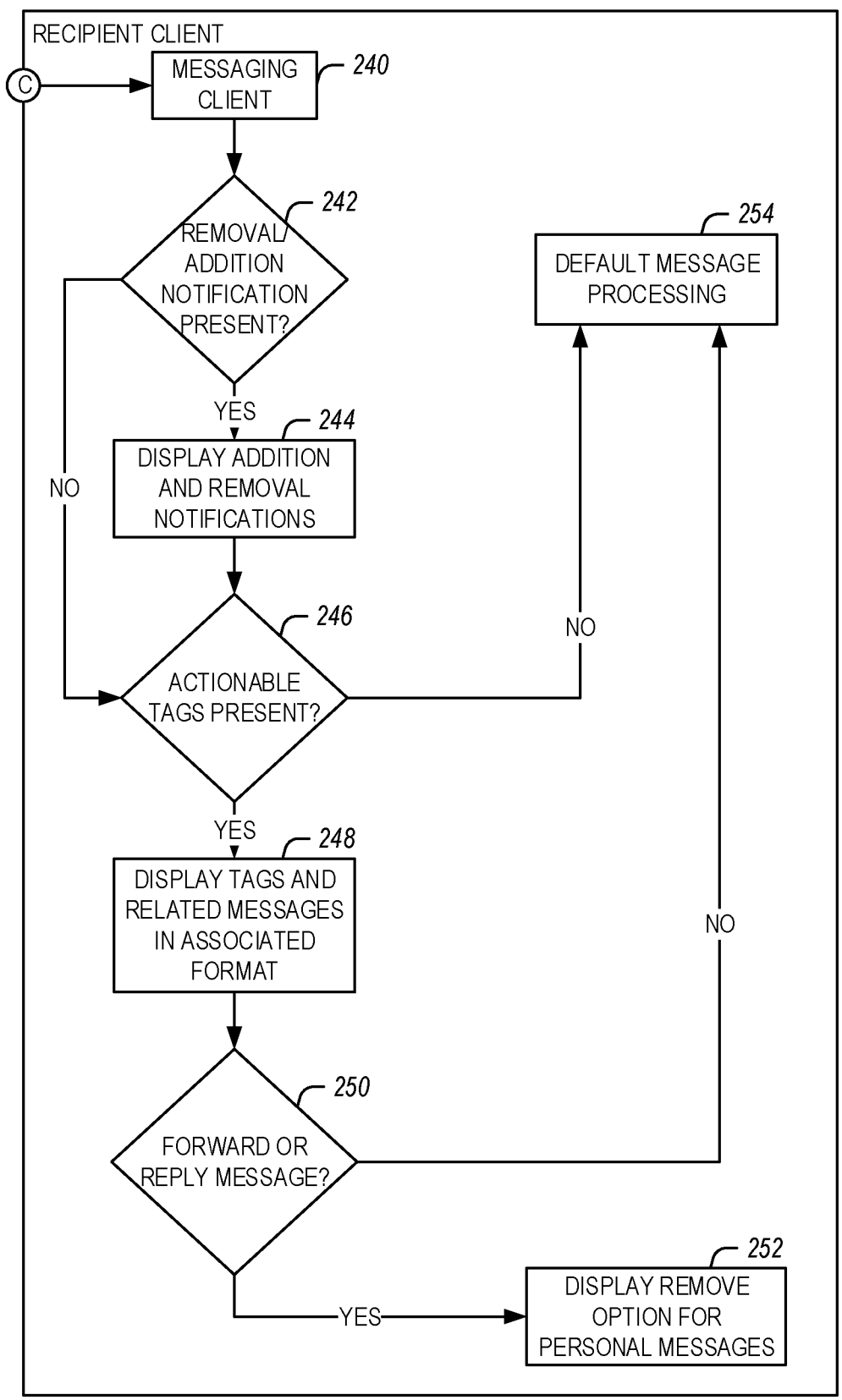
FIG. 2C illustrates a data flow diagram of an example of a process for a client for multiple message composition using actionable tags, according to an embodiment.

FIGS. 2A, 2B, and 2C illustrate a data flow diagram of an example of a process for clients and servers for multiple message composition using actionable tags, according to an embodiment. FIGS. 2A, 2B, and 2C may provide features as described in FIG. 1.

FIG. 2A illustrates a data flow diagram of an example of a process for a client for multiple message composition using actionable tags, according to an embodiment. At operation 202 a messaging client receives message content from a user (e.g., an email message, a comment, a chat item, etc.). The messaging client determines if actionable tags are present in the message content at decision 204. If no actionable tags are present in the message content, the message is processed using default message processing at operation 206 and the message is transmitted without actionable tag processing.

If actionable tags are present (e.g., as determined at decision 204), the actionable tags are identified and separated at operation 208. Timestamps or other information indicating whether an actionable tag has been newly created or was previously created are obtained for identified actionable tags for the message thread (e.g., from storage 228 as shown in FIG. 2B). Personal actionable tags are identified at operation 212 and removal actionable tags are identified at operation 214. A variety of other actionable tag types may be similarly identified. The messaging client 202 determines if old (e.g., previously created in prior messages, etc.) actionable tags are present in the message at decision 216. If old actionable tags are present in the message store (e.g., as determined at decision 216), the old tags are included without initiating action at operation 218. If there are no old actionable tags present or when the old actionable tags have been processed at operation 218, it is determined if new actionable tags are present in the message at decision 220. If there are no actionable tags present as determined at decision 220, the old actionable tags are included with the message body and recipients for transmission to a message splitter 230 as described in FIG. 2B.

If there are new actionable tags present as determined at decision 220, actions (e.g., adding or removing recipients from a recipient list, generating files (e.g., calendar entry files, etc.), etc.) are performed for the new actionable tags at operation 222. The new tags are included with actions at operation 224 and the new actionable tags including any associated content is merged with the message body, non-actionable tags, and recipients. The merged content is then transmitted to the message splitter 230 as described in FIG. 2B.

FIG. 2B illustrates a data flow diagram of an example of a process for a server for multiple message composition using actionable tags, according to an embodiment. At operation 230, the message splitter generates a message for each recipient including the content designated (e.g., not tagged, etc.) for all recipients and private or removal content for corresponding recipients. A set of messages is generated at operation 228 including a variety of messages including content for the various recipients based on the actionable tags.

At operation 232, a notification generator adds notifications for silent additions and removal. For example, a removed recipient receives a message indicating that they she was removed from the message thread by the sender along with any content provided along with the removal actionable tag in addition to the content destined for all recipients. The other recipients receive a notification indicating that the recipient was removed by the sender. In another example, a notification is included in a message to the existing recipients if the sender as added a new recipient that indicates that the new recipient was added to the message thread by the sender.

The message splitter generates a default message 235 at operation 230 that includes general content that was provided by the sender outside of an actionable tag and notifications that are destined for the recipient list. The default message 234 is used as a base message for messages that are destined for recipients that are the subject of an actionable tag. The default message 234 is merged with actionable tag content for each recipient at operation 236. The message splitter generates individual messages 238 for each recipient that is the subject of an actionable tag at operation 230. The actionable tag content may be collated or otherwise aggregated for inclusion in the individual message 238 to be provided in-line with the content of the default message 234. The messages are then added to storage 228 and transmitted to the corresponding recipient messaging clients 240 as shown in FIG. 2C.

FIG. 2C illustrates a data flow diagram of an example of a process for a client for multiple message composition using actionable tags, according to an embodiment. At operation 240, the messaging client receives a message from the sender. The messaging client determines if a recipient removal or addition notification is present at decision 242. If removal or addition notifications are present (e.g., as determined at decision 232), the addition and removal notifications are displayed at operation 234 and processing continues at decision 246 to determine if actionable tags are present. If recipient removal or addition notifications are not present as determined at decision, processing continues at decision 246 to determine if actionable tags are present. The messaging client 240 determines if actionable tags are present in the message at operation 246. If not, the message is processed using default message processing at operation 254. If actionable tags are determined to be present (e.g., as determined at decision 246, the tags and related messages are displayed in an associated format (e.g., blue for private messages, red for removal messages, in a calendar application, in a task manager application, etc.) at operation 248.

At decision 250, the messaging client 240 determines if the message is a forward or reply message. If not, remaining message content is processed using default message processing at operation 254. If the message is a forward or reply message (e.g., as determined at decision 250), an option is displayed in the messaging user interface that allows the user to remove the personal messages at operation 252.

Figure 3:
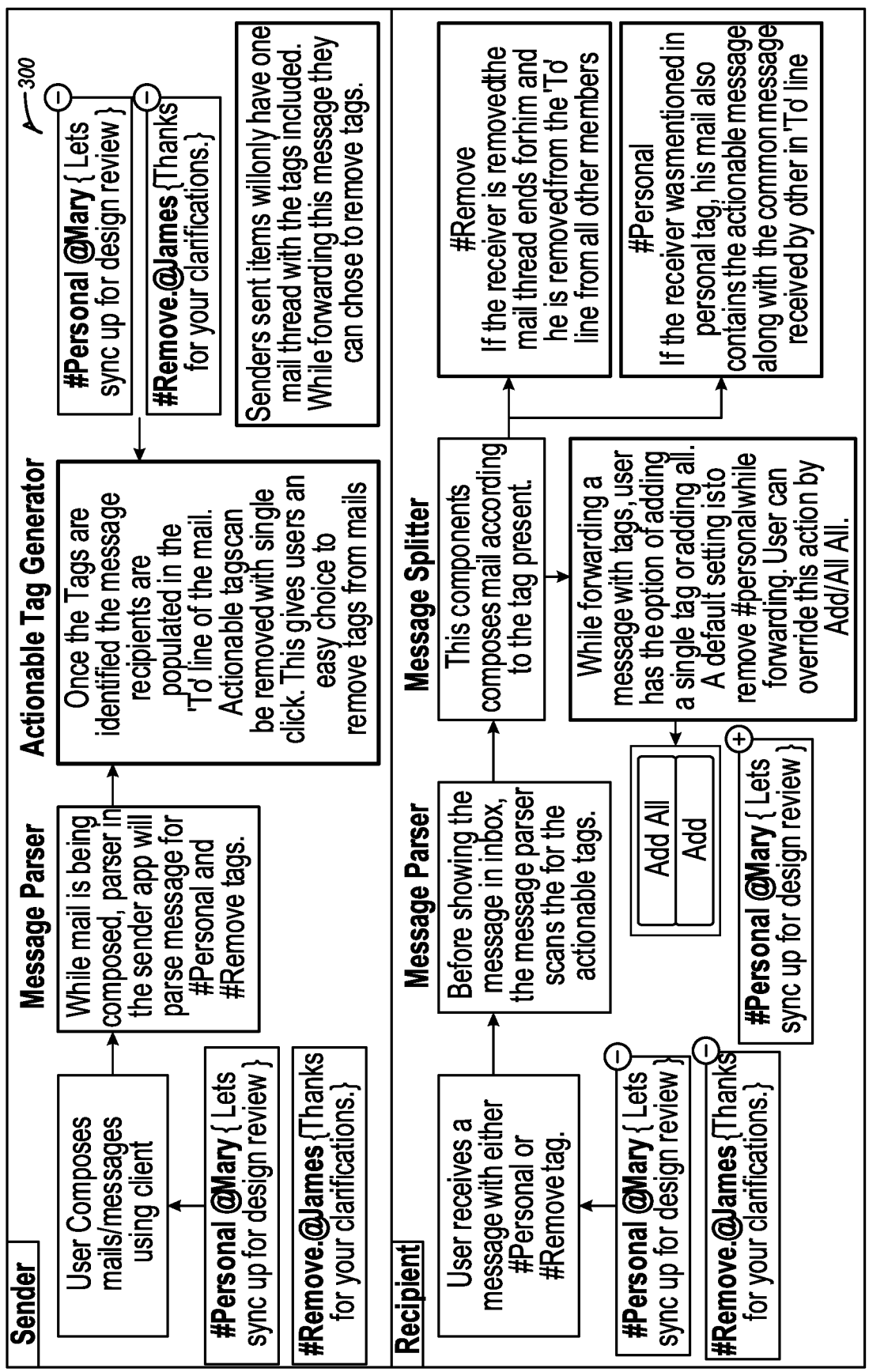
FIG. 3 is a flow diagram that illustrates an example of message flow for multiple message composition using actionable tags, according to an embodiment.

FIG. 3 is a flow diagram 300 that illustrates an example of message flow for multiple message composition using actionable tags, according to an embodiment. The flow diagram 300 may provide features as described in FIGS. 1, 2A, 2B, and 2C.

As shown in FIG. 3, a user may compose a message (e.g., email, comment, chat, etc.) using a messaging client (e.g., a locally executing software client, a web-based software client, etc.). The user may include actionable tags that include, by way of example and not limitation, #Personal, #Remove, etc. The user provides one or more recipient identifiers to indicate a subject of an actionable tag. For example, the recipient identifier may be a handle for a recipient enabled by the client (e.g., @recipient name, etc.), an email address, etc. The user may also include content to be transmitted to the recipient. The content may be indicated by start and end symbols (e.g., { }, etc.) or may provide the content in a popup bubble or other input mechanism provided by the client to identify content associated with the actionable tag.

A message parser (e.g., message parser 120 as described in FIG. 1, etc.) parses the message to identify actionable tags (e.g., #Personal, #Remove, etc.). An actionable tag generator (e.g., the actionable tag generator 125 as described in FIG. 1, etc.) modifies a recipients list (e.g., add recipients, remove recipients, etc.) for the message (e.g., in conjunction with the recipient manager 130 as described in FIG. 1, etc.) and generates actionable tags that include controls for managing the actionable tags (e.g., edit, delete, etc.), colors, interface elements (e.g., an input bubble element for content, etc.).

A message splitter (e.g., the message splitter 140 as described in FIG. 1, etc.) generates a message for each recipient that includes actionable tags that for which a recipient is the subject. For example, recipients that have not been tagged will receive a default message that includes general content that was provided outside of an actionable tag and any recipient addition or removal messages that are destined for all recipients. Tagged recipients receive the default message and the actionable for which the tagged recipient was a subject. Notifications to tagged recipients may be the same as the notifications included in the default message or may be modified to include specific content for the tagged recipient. For example, a recipient that is the subject of a #remove actionable tag may receive a notification of removal from the message stream by the sender along with personal content from the sender while other recipients may receive a general notification indicating that the tagged recipient was removed by the sender.

The recipient may receive a message that includes actionable tags. A parser in the recipient message client parses the received message to identify the actionable tags and provides the actionable tags and associated content in a user interface of the recipient client for display to the recipient. The actionable tags are displayed with controls that allow the recipient to remove actionable tags when forwarding or replying to the message. When a recipient replies or forwards a message received with actionable tags, they become the sender and the messaging client operates as described above. The actionable tags may be timestamped or otherwise tracked to determine if an actionable tag in a message is a new actionable tag or an old actionable tag. The messaging client will maintain old actionable tags in a message without performing an action while new actionable tags will trigger the client to perform an associated action (e.g., remove a recipient, add a recipient, generate content, generate a file, etc.).

FIGS. 4A to 4D illustrate an example of a message exchange that includes a personal message actionable tag provided by a sender. FIGS. 4A to 4D may provide features as described in FIGS. 1, 2A, 2B, 2C, and 3.

Figure 4A:
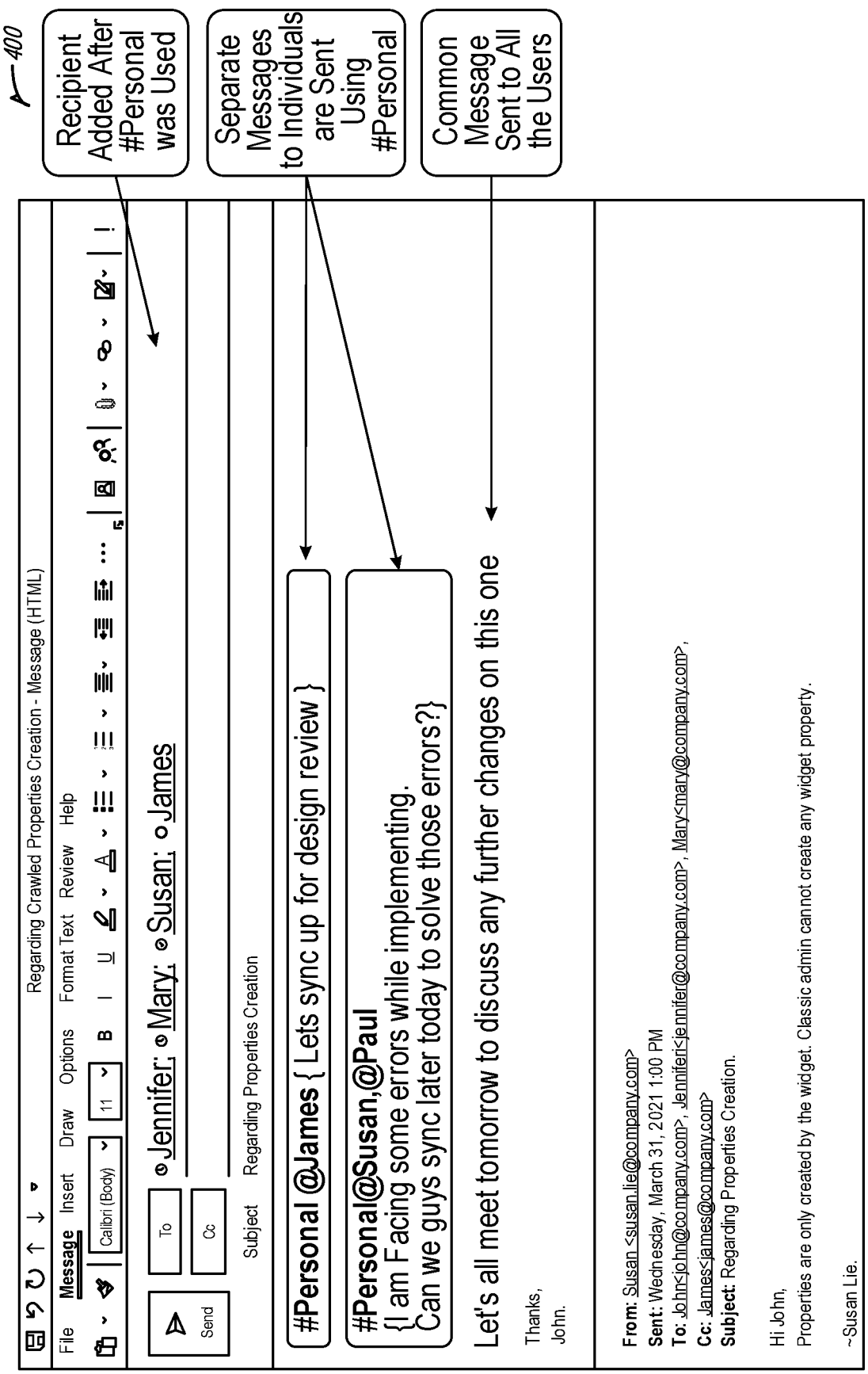
FIG. 4A illustrates an example of an electronic message client sender view with personal message tags for multiple message composition using actionable tags, according to an embodiment.

FIG. 4A illustrates an example of an electronic message client sender view 400 with personal message tags for multiple message composition using actionable tags, according to an embodiment. As shown in view 400, a sender has entered two personal message actionable tags by typing #Personal to identify that a personal message actionable tag should be created. In the first personal message actionable tag, the sender has provided a recipient identifier of @James and has included content to be transmitted to recipient James. The start and end of the content are indicated by curly braces to form {Lets sync up for design review}.

In the second personal message actionable tag, the sender has provided recipient identifiers @Susan and @Paul indicating that the personal message actionable tag content should be transmitted to both Susan and Paul. As with the content of the first personal message actionable tag, the content for the second personal message actionable tag is surrounded by curly braces to indicate the start and end of the content for Susan and Paul.

The sender has also provided content to be provided to all recipients which is indicated by plain text or other content not associated with an actionable tag (e.g., not surrounded by curly braces or another start and end indicator pair. In this example, recipient James was not part of the existing message stream so James has been automatically added to the to line during processing of the actionable tag. As detailed in FIGS. 1, 2A to 2C, and 3, the message composed by the sender is parsed (e.g., by the parser 120 as described in FIG. 1, etc.) during composition (or upon sending, etc.) to identify actionable tags present in the message. In this case, the parser identifies a personal message actionable tag for James and a personal message actionable tag for Susan and Paul. An actionable tag generator (e.g., the actionable tag generator 125 as described in FIG. 1, etc.) generates the actionable tags and may display a bubble element in the message composition interface for entry of the recipient identifiers, content, etc. or may process the actionable tag content to prepare the content for delivery to a message splitter (e.g., the message splitter 140 as described in FIG. 1, etc.).

The message splitter generates a default message that is to be sent to Jennifer and Mary based on them not being associated with an actionable tag in the message. The default message will not include the content associated with the personal message actionable tags, but rather the common content that is designated for all recipients. A second message is generated for James that includes the content from the default message as well as the personal content actionable tag content with which James is associated. A third message is generated for transmission to Susan and Paul that includes the content from the default message and the content associated with the actionable Susan and Paul have been associated with. Thus, each user receives a message including their personal content and the common content for all recipients.

FIG. 4B illustrates an example of an electronic message client non-tagged recipient view 405 for multiple message composition using actionable tags, according to an embodiment. As shown if view 405, the message received by Mary and Jennifer includes only the common content from the sender (e.g., as shown in FIG. 4A) without including the personal content designated for James, Susan, and Paul.

FIG. 4C illustrates an example of an electronic message client tagged recipient view 410 for multiple message composition using actionable tags, according to an embodiment. As shown in view 410, Susan receives a version of the message that includes her personal content for the actionable tag that Susan was associated with along with the common content for all recipients. While not shown, Paul would receive a similar version of the message because he was also associated with the actionable tag that Susan was associated with.

Figure 4D:
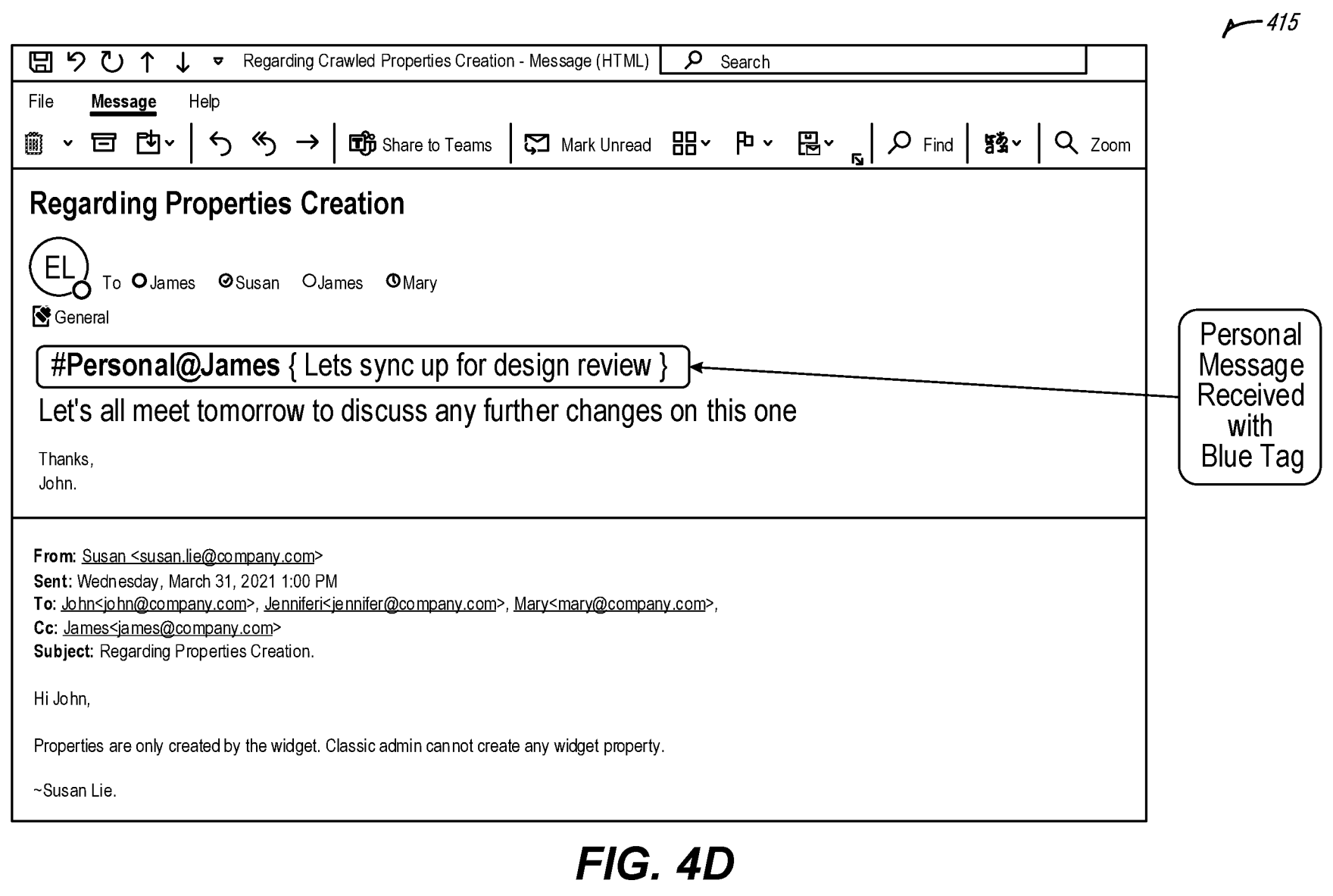

FIG. 4D illustrates an example of an electronic message client tagged recipient view 415 for multiple message composition using actionable tags, according to an embodiment. As shown in view 415, James receives a version of the message that includes his personal content for the actionable tag that James was associated with along with the common content for all recipients. The actionable tags and content displayed for the user may be displayed in color or may otherwise be highlighted to reduce the occurrence of missed personal messages that may request response or other action of the recipient by the sender.

FIGS. 5A to 5F illustrate an example of a message exchange that includes a recipient removal actionable tag provided by a sender, according to an embodiment. FIGS. 5A to 5F may provide features as described in FIGS. 1, 2A, 2B, 2C, and 3.

Figure 5A:
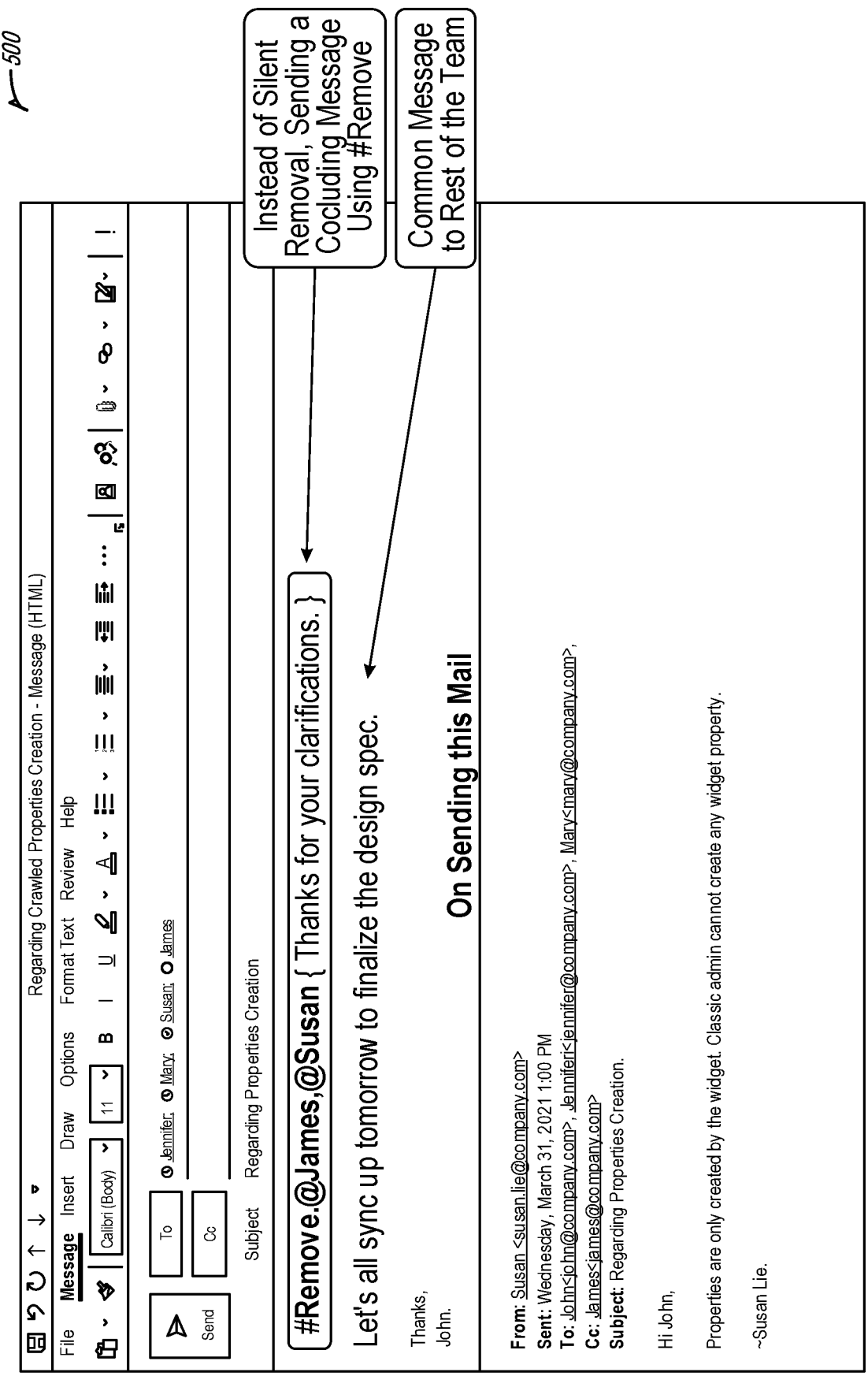
FIG. 5A illustrates an example of an electronic message client sender view with a recipient removal tag for multiple message composition using actionable tags, according to an embodiment.

FIG. 5A illustrates an example of an electronic message client sender view 500 with a recipient removal tag for multiple message composition using actionable tags, according to an embodiment. As shown in view 500, a sender has composed a message including a recipient removal actionable tag and a common message destined for all recipients. The sender has typed an actionable tag identifier of #Remove and has provided recipient identifiers of @James and @Susan. The sender has also provided content for the recipient removal actionable tag as indicated by text surrounded by curly brackets.

A parser (e.g., the parser 120 as described in FIG. 1, etc.) evaluates content as it is created in the composition interface to identify actionable tags. In the example, the parser identifies #Remove as an identifier for a recipient removal actionable tag. The actionable tag is generated by an actionable tag generator (e.g., the actionable tag generator 125 as described in FIG. 1, etc.) and associated with recipients James and Susan. A message splitter (e.g., the message splitter 140 as described in FIG. 1, etc.) generates a default message including the common message (e.g., the content not associated with an actionable tag, etc.) for transmission to Jennifer and Mary because they are not associated with an actionable tag. A second message is generated that includes the actionable tag content for James and Susan because they are associated with the recipient removal actionable tag and are being removed from the message stream. Thus, they may not receive the common message as they are being removed from the message stream.

FIG. 5B illustrates an example of an electronic message client sender view 505 of a sent message with a recipient removal tag for multiple message composition using actionable tags, according to an embodiment. As shown in view 505, a sent item is stored in a sent messages folder of the sender that includes the recipient removal actionable tag.

FIG. 5C illustrates an example of an electronic message client non-tagged recipient view 510 for multiple message composition using actionable tags, according to an embodiment. As shown in view 510, the common message has been transmitted to Jennifer because she was not associated with the recipient removal actionable tag. James and Susan have been removed from the recipients list and will not be included in subsequent replies. A notification generator (e.g., the notification generator 135 as described in FIG. 1, etc.) generates a notification for inclusion in the default message to indicate to remaining recipients that James and Susan have been removed from the message stream by John (e.g., the sender). Notifications generated by the notification generator are added to messages by the message splitter when generating message for the recipients when notification is a designated action to be completed when processing an actionable tag.

FIG. 5D illustrates an example of an electronic message client non-tagged recipient view 515 for multiple message composition using actionable tags, according to an embodiment. As shown in view 515, similar to view 510, the common message has been transmitted to Mary because she was not associated with the recipient removal actionable tag. Mary receives the same common message and notification based on information received by the message splitter including common content, actionable tags, and recipients.

Figure 5E:
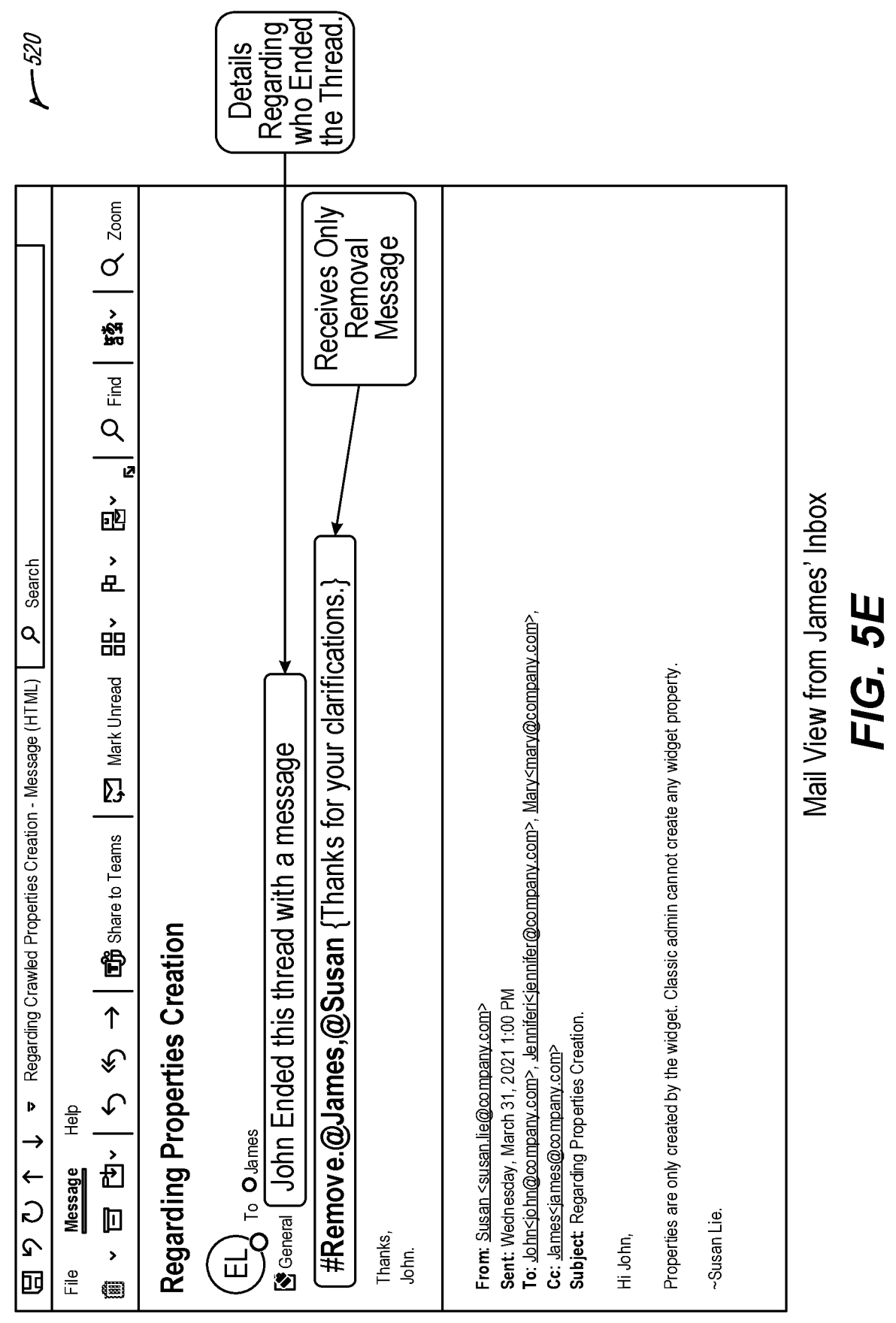

FIG. 5E illustrates an example of an electronic message client tagged recipient view 520 for multiple message composition using actionable tags, according to an embodiment. As shown in view 520, a message has been generated for transmission to James by the message splitter that includes the recipient removal actionable tag and associated content. The notification generator generates a notification for inclusion in the message to James that provides an indication of who removed him from the message stream.

FIG. 5F illustrates an example of an electronic message client tagged recipient view 525 for multiple message composition using actionable tags, according to an embodiment. As shown in view 525, similar to view 520, a message has been generated for transmission to Susan by the message splitter that includes the recipient removal actionable tag and associated content. The notification generator generates a notification for inclusion in the message to Susan that provides an indication of who removed her from the message stream.

Figure 6:
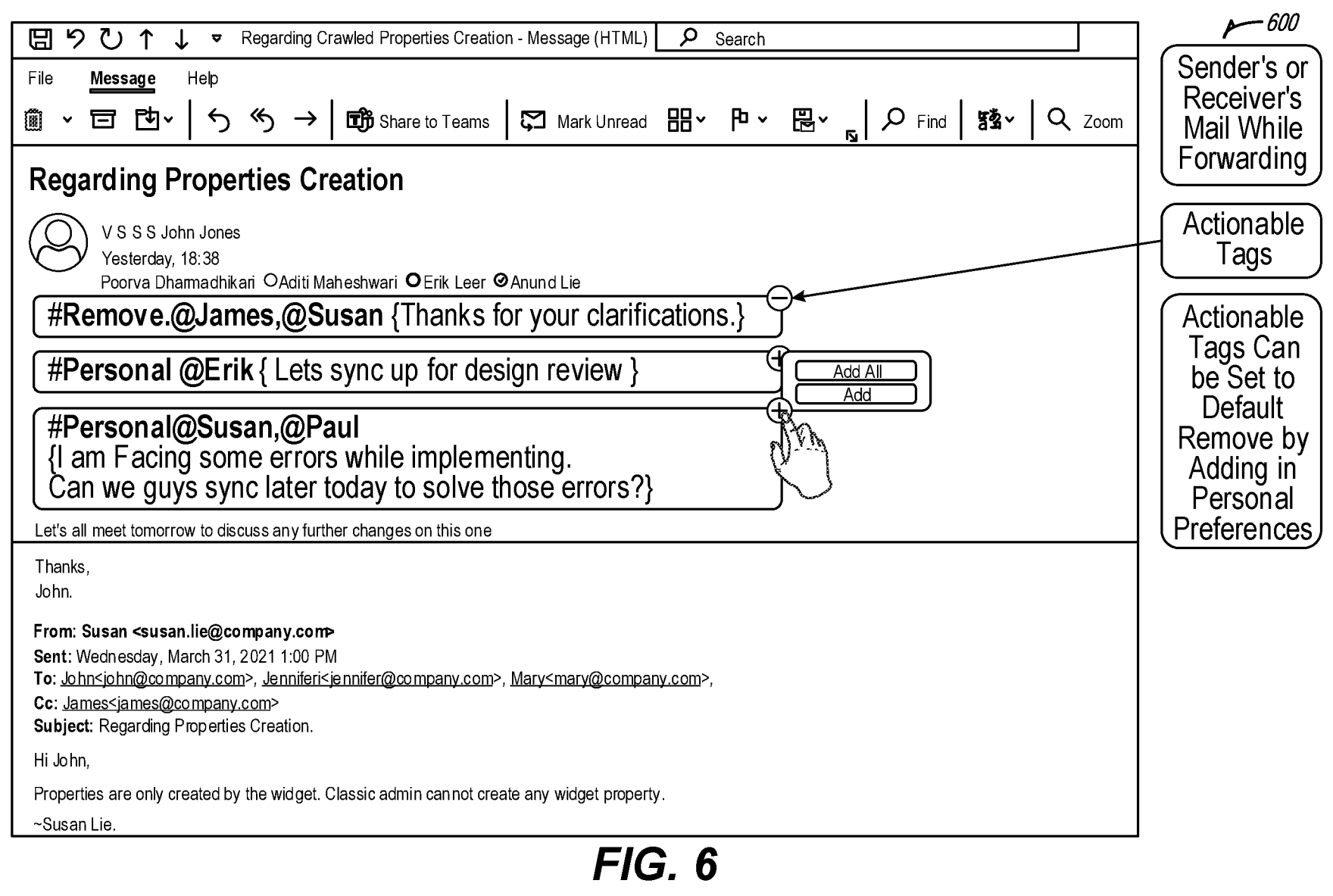

FIG. 6 illustrates an example of an electronic message client interface view 600 that includes actionable tag management controls for multiple message composition using actionable tags, according to an embodiment. The view 1400 may provide features as described in FIGS. 1, 2A, 2B, 2C, and 3. As shown in view 600, controls are included in actionable tags that provided a user with a mechanism for managing the actionable tags. The controls are displayed when an actionable tag is identified by the parser and the actionable tag is generated by the actionable tag generator allowing the user to delete or modify actionable tags before sending. The controls may also be provided when a recipient of a message including an actionable tag is composed as a forwarded message or a reply message allowing the recipient (now the sender) to add or remove the actionable tags from the message before ending the forwarded message or reply.

The messaging client may provide a configuration interface that receives personalization options for managing actionable tags. For example, the configuration interface presents the user with options for setting default actionable tag handling rules for reply messages and forwarded messages. For example, the user may configure the messaging client to always remove actionable tags from forwarded messages while maintaining actionable tags in reply messages. In addition, the user is presented with an interface for creating custom actionable tags that may perform user defined action or may provide shortcut commands for actionable tag identifiers to allow the user to type shorthand recognizable identifiers in a composition window to trigger identification of an actionable tag.

FIGS. 7A to 7C illustrate an example of a message including a personal message actionable tag included in a document comment posted by a user, according to an embodiment. FIGS. 7A to 7C may provide features as described in FIGS. 1, 2A, 2B, 2C, and 3.

FIG. 7A illustrates an example of a document editor view 700 of a document with a comment that includes a personal message tag for multiple message composition using actionable tags, according to an embodiment. As shown in view 700, a user has created a comment for a document that includes an actionable tag. The parser identifies #Personal as an identifier for a personal message actionable tag and the actionable tag generator generates the actionable tag for inclusion in the comment when viewed by recipient Paul based on the association of the @Paul recipient identifier with the personal message actionable tag. When Paul views the comment for the document, he will see the personal content. When other users view the document, they will not be presented with the personal content designated for Paul. The message splitter generates or manages display of comments in the document so that common content is viewable by all user and personal content is viewable by the specified recipients.

FIG. 7B illustrates an example of a document editor view 705 for a tagged recipient of a comment with a personal message tag for multiple message composition using actionable tags, according to an embodiment. As shown in view 705, when Paul views the document, he is able to view the personal message provided in the actionable tag. Controls are provided to allow Paul to reply to the comment or to mention the personal message.

FIG. 7C illustrates an example of a document editor view 710 for a non-tagged recipient of a comment with a personal message tag for multiple message composition using actionable tags, according to an embodiment. As shown in view 710, users other than Paul and the creator of the actionable tag cannot view the personal content specified for Paul. Thus, users that are not subjects of actionable tags may view the document without having to sort through comments that may not be relevant to the users.

Figure 8A:
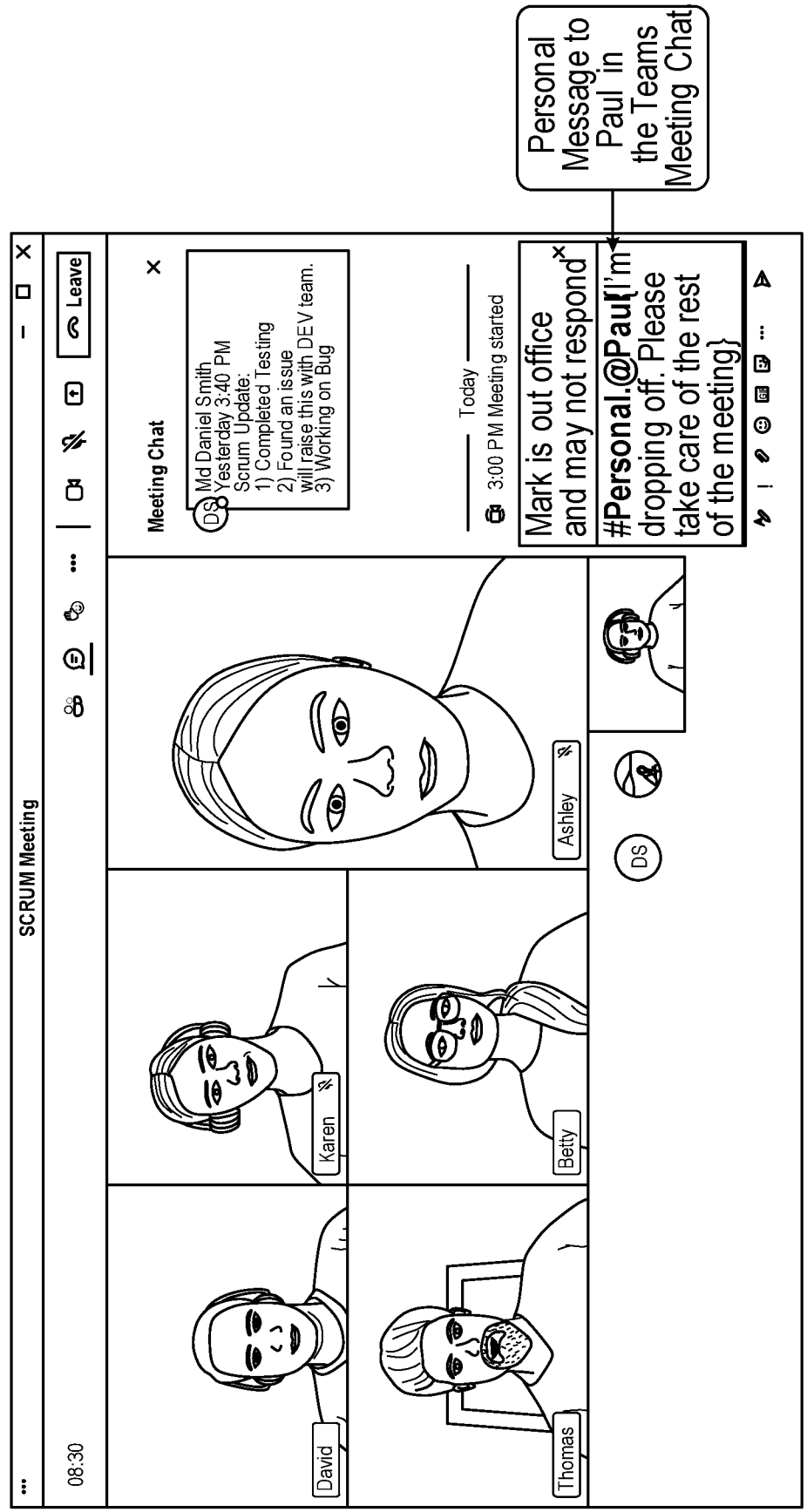
FIG. 8A illustrates an example of a chat interface view of a chat element that includes a personal message tag for multiple message composition using actionable tags, according to an embodiment.
Figure 8B:
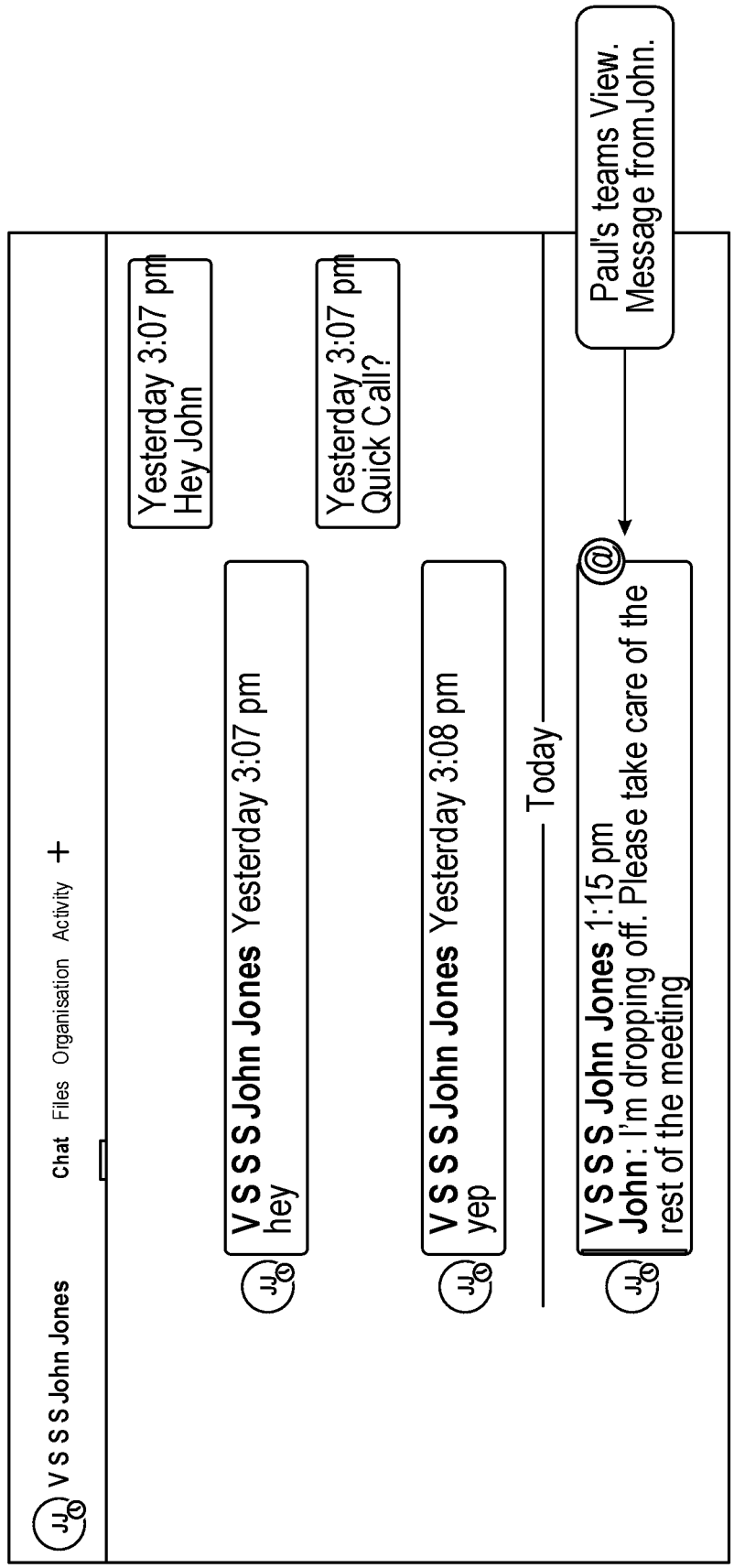
FIG. 8B illustrates an example of a chat interface view of a chat element for a tagged recipient that includes a personal message from a personal message tag provided by a sender for multiple message composition using actionable tags, according to an embodiment.

FIGS. 8A and 8B illustrate an example of a chat message including a personal message actionable tag provided by a sender, according to an embodiment. The view 1800 may provide features as described in FIGS. 1, 2A, 2B, 2C, and 3.

FIG. 8A illustrates an example of a chat interface view 800 of a chat element that includes a personal message tag for multiple message composition using actionable tags, according to an embodiment. As shown in view 800, a user has included a personal message actionable tag in a chat message of a video conferencing application and chat application. The parser identifies #Personal as an identifier for a personal message actionable tag and works in conjunction with the actionable tag generator to generate an actionable tag including content for Paul as indicated by including of the recipient identifier of @Paul. The message splitter prepares a message for transmission to Paul that includes the personal message actionable tag content and other content that is designated for delivery to all recipients. In the example, there is no common content included in the message so the message splitter will create only a message to Paul that includes the personal message actionable tag content.

FIG. 8B illustrates an example of a chat interface view 805 of a chat element for a tagged recipient that includes a personal message from a personal message tag provided by a sender for multiple message composition using actionable tags, according to an embodiment. As shown in view 805, a message is delivered to Paul including the personal message actionable tag content while other recipients or participants do not receive a message from John.

Figure 9:
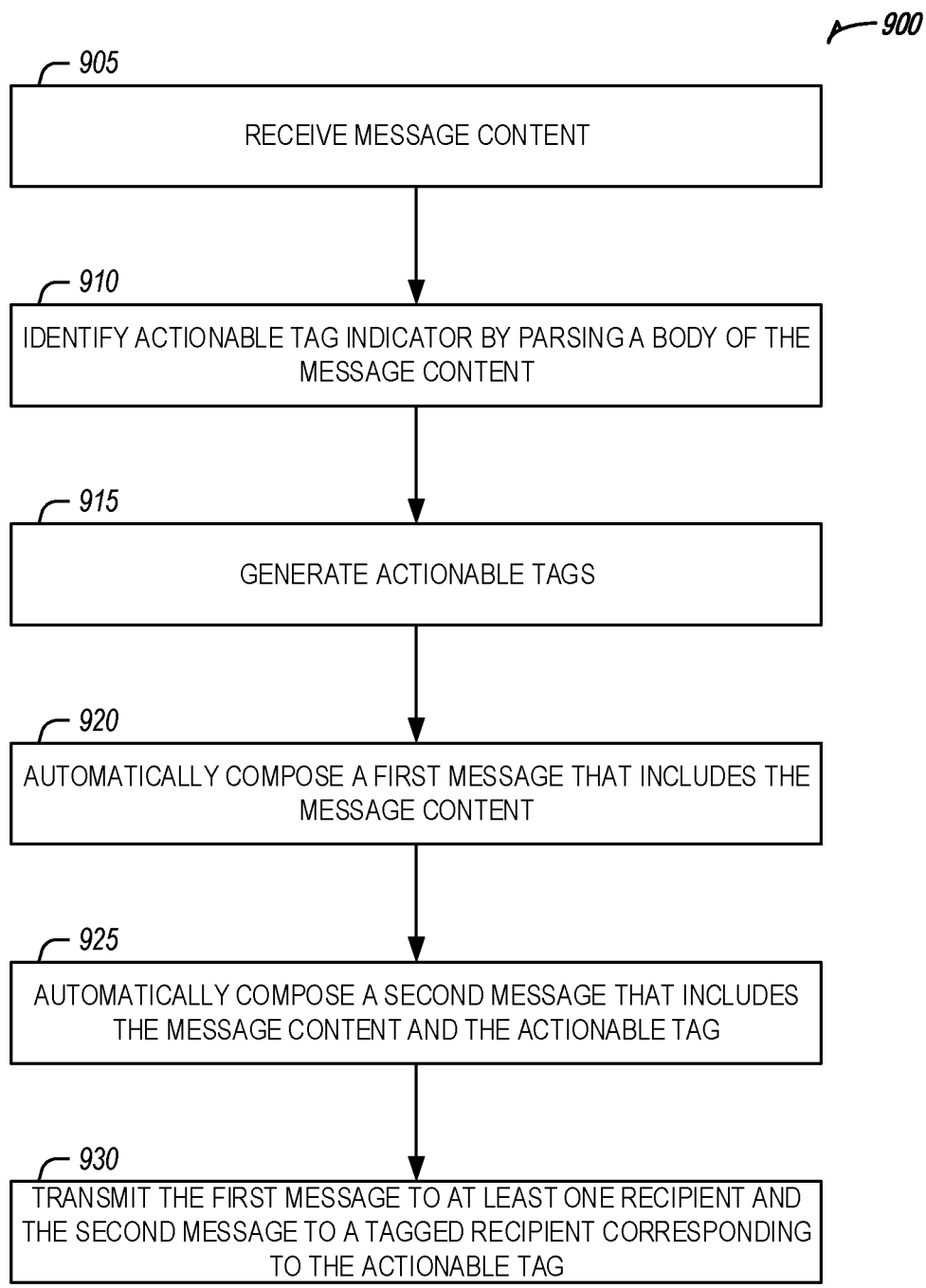
FIG. 9 illustrates an example of a method for multiple message composition using actionable tags, according to an embodiment.

FIG. 9 illustrates an example of a method 900 for multiple message composition using actionable tags, according to an embodiment. The method 900 may provide features as discussed in FIGS. 1, 2A to 2C, 3, 4A to 4D, 5A to 5F, 6, 7A to 7C, 8A and 8B.

At operation 905, message content is received from a messaging client user interface. At operation 910, an actionable tag indicator is identified by parsing a body of the message content. In an example, a previous actionable tag may be identified in the body of the message content. It is determined that previous action has been initiated for the previous actionable tag and the previous actionable tag is included in the message content without initiating an action.

At operation 915, an actionable tag is generated based on the identified actionable tag indicator. In an example, the actionable tag is a personal message actionable tag, a recipient removal actionable tag, a meeting request actionable tag, a reminder actionable tag, a translation actionable tag, or a task actionable tag. The generated actionable tag includes the actionable tag indicator, a recipient identifier, and content. In an example, the actionable tag indicator indicates that the actionable tag is a private message actionable tag. It is determined that the tagged recipient is not in a recipient list that includes at least one recipient and the tagged recipient is added to the recipient list. A recipient addition notification is generated and the recipient addition notification is transmitted to the at least one recipient. In another example, the actionable tag indicator indicates that the actionable tag is a recipient removal actionable tag. A recipient removal notification is generated that includes the recipient identifier and a sender identifier. The recipient removal notification is transmitted to the at least one recipient and the tagged recipient is removed from the recipient list.

At operation 920, a first message is automatically composed that includes the message content. At operation 925, a second message is automatically composed that includes the message content and the actionable tag. In an example, the actionable tag includes private content to be delivered to the tagged recipient in the second message without transmission to the at least one recipient in the first message. In an example, the private content is identified by a private content start indicator and a private content end indicator identified in the body of the message content in association with the actionable tag. In an example, the private content start indicator and the private content end indicator is a character pair or a beginning and end of a text array. In another example, a bubble user interface element is generated to receive the recipient identifier and actionable tag content.

At operation 930, the first message is transmitted to the at least one recipient and the second message is transmitted to a tagged recipient associated with the recipient identifier corresponding to the actionable tag.

In an example, a tag modification control is presented in the message messaging client user interface in correspondence with the actionable tag. The tag modification control includes a deletion control and upon selection of the deletion control, the actionable tag is removed from the message content. In an example, personalization configuration information may be received via the user interface and the actionable tag may be processed using the personalization configuration information. In an example, the personalization configuration information includes an alias for the actionable tag indicator and the actionable tag indicator may be identified using the alias.

Figure 10:
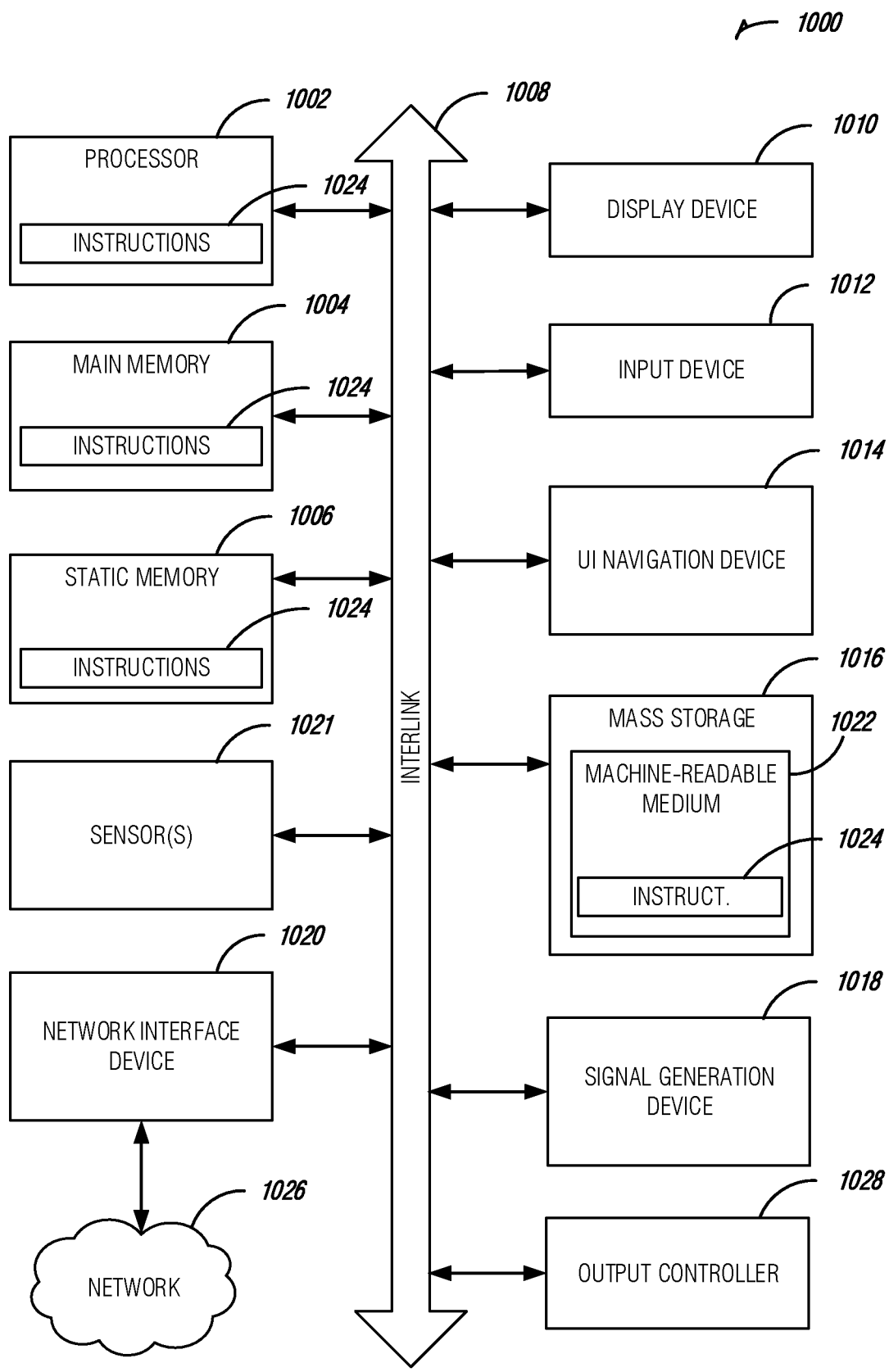
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

ADDITIONAL NOTES & EXAMPLES

Example 1 is a system for multiple message composition using actionable tags. The system comprising at least one processor and memory including instructions. When executed by the at least one processor, the instructions cause the at least one processor to perform operations. Message content is received from a user interface. An actionable tag indicator is identified by a parser by parsing a body of the message content. The actionable tags are identified in-line with the message content reducing computing cycles from additional menu or application feature activations. An actionable tag is generated based on the identified actionable tag indicator. The generated actionable tag includes the actionable tag indicator, a recipient identifier, and content. A first message is automatically composed that includes the message content. A second message is automatically composed that includes the message content and the actionable tag. The first message is transmitted to at least one recipient and the second message is transmitted to a tagged recipient associated with the recipient identifier corresponding to the actionable tag. Storage utilization is reduced by transmitting one message to each recipient that includes tagged content in contrast to conventional techniques that use multiple messages to transmit common content and personal content to a recipient reducing duplicated content. The system of example 1 also reduces mailbox clutter and overlooked action items by presenting action items in the actionable tag to alert a tagged recipient of the individualized content.

In Example 2, the subject matter of Example 1 wherein, the actionable tag indicator indicates that the actionable tag is a private message actionable tag and the memory further comprising instructions that, when executed by the at least one processor, cause the at least one processor to perform operations to: determine that the tagged recipient is not in a recipient list that includes the at least one recipient; add the tagged recipient to the recipient list; generate a recipient addition notification; and transmit the recipient addition notification to recipients of the recipients list.

In Example 3, the subject matter of Examples 1-2 wherein, the actionable tag indicator indicates that the actionable tag is a recipient removal actionable tag and the memory further comprising instructions that, when executed by the at least one processor, cause the at least one processor to perform operations to: generate a recipient removal notification including the recipient identifier and a sender identifier; transmit the recipient removal notification to the at least one recipient; and remove the tagged recipient from a recipient list.

In Example 4, the subject matter of Examples 1-3 includes, the memory further comprising instructions that, when executed by the at least one processor, cause the at least one processor to perform operations to: identify a previous actionable tag in the body of the message content; determine that previous action has been initiated for the previous actionable tag; and include the previous actionable tag in the message content without initiating an action.

In Example 5, the subject matter of Examples 1-4 includes, the memory further comprising that, when executed by the at least one processor, cause the at least one processor to perform operations to: present a tag modification control in the message messaging client user interface in correspondence with the actionable tag, wherein the tag modification control includes a deletion control; and upon selection of the deletion control, remove the actionable tag from the message content.

In Example 6, the subject matter of Examples 1-5 wherein, the actionable tag includes private content to be delivered to the tagged recipient in the second message without transmission to the at least one recipient in the first message.

In Example 7, the subject matter of Example 6 wherein, the private content is identified by a private content start indicator and a private content end indicator identified in the body of the message content in association with the actionable tag.

In Example 8, the subject matter of Example 7 wherein, the private content start indicator and the private content end indicator is a character pair or a beginning and end of a text array.

In Example 9, the subject matter of Examples 1-8 wherein, the instructions to generate the actionable tag includes instructions to generate a bubble user interface element to receive the recipient identifier and actionable tag content.

In Example 10, the subject matter of Examples 1-9 includes, the memory further comprising instructions that, when executed by the at least one processor, cause the at least one processor to perform operations to: receive personalization configuration information via the user interface; and process the actionable tag using the personalization configuration information.

In Example 11, the subject matter of Example 10 wherein, the personalization configuration information includes an alias for the actionable tag indicator and the memory further comprising instructions that, when executed by the at least one processor, cause the at least one processor to perform operations to identify the actionable tag indicator using the alias.

In Example 12, the subject matter of Examples 1-11 wherein, the actionable tag is a personal message actionable tag, a recipient removal actionable tag, a meeting request actionable tag, a reminder actionable tag, a translation actionable tag, or a task actionable tag.

Example 13 is at least one non-transitory machine-readable medium including instructions for multiple message composition using actionable tags that, when executed by at least one processor, cause the at least one processor to perform operations. Message content is received from a user interface. An actionable tag indicator is identified by a parser by parsing a body of the message content. The actionable tags are identified in-line with the message content reducing computing cycles from additional menu or application feature activations. An actionable tag is generated based on the identified actionable tag indicator. The generated actionable tag includes the actionable tag indicator, a recipient identifier, and content. A first message is automatically composed that includes the message content. A second message is automatically composed that includes the message content and the actionable tag. The first message is transmitted to at least one recipient and the second message is transmitted to a tagged recipient associated with the recipient identifier corresponding to the actionable tag. Storage utilization is reduced by transmitting one message to each recipient that includes tagged content in contrast to conventional techniques that use multiple messages to transmit common content and personal content to a recipient reducing duplicated content. The at least one non-transitory machine-readable medium of example 13 also reduces mailbox clutter and overlooked action items by presenting action items in the actionable tag to alert a tagged recipient of the individualized content.

In Example 14, the subject matter of Example 13 wherein, the actionable tag indicator indicates that the actionable tag is a private message actionable tag and further comprising instructions that, when executed by the at least one processor, cause the at least one processor to perform operations to: determine that the tagged recipient is not in a recipient list that includes the at least one recipient; add the tagged recipient to the recipient list; generate a recipient addition notification; and transmit the recipient addition notification to recipients of the recipient list.

In Example 15, the subject matter of Examples 13-14 wherein, the actionable tag indicator indicates that the actionable tag is a recipient removal actionable tag and further comprising instructions that, when executed by the at least one processor, cause the at least one processor to perform operations to: generate a recipient removal notification including the recipient identifier and a sender identifier; transmit the recipient removal notification to the at least one recipient; and remove the tagged recipient from a recipient list.

In Example 16, the subject matter of Examples 13-15 includes, instructions that, when executed by the at least one processor, cause the at least one processor to perform operations to: identify a previous actionable tag in the body of the message content; determine that previous action has been initiated for the previous actionable tag; and include the previous actionable tag in the message content without initiating an action.

In Example 17, the subject matter of Examples 13-16 includes, that, when executed by the at least one processor, cause the at least one processor to perform operations to: present a tag modification control in the message messaging client user interface in correspondence with the actionable tag, wherein the tag modification control includes a deletion control; and upon selection of the deletion control, remove the actionable tag from the message content.

In Example 18, the subject matter of Examples 13-17 wherein, the actionable tag includes private content to be delivered to the tagged recipient in the second message without transmission to the at least one recipient in the first message.

In Example 19, the subject matter of Example 18 wherein, the private content is identified by a private content start indicator and a private content end indicator identified in the body of the message content in association with the actionable tag.

In Example 20, the subject matter of Example 19 wherein, the private content start indicator and the private content end indicator is a character pair or a beginning and end of a text array.

In Example 21, the subject matter of Examples 13-20 wherein, the instructions to generate the actionable tag includes instructions to generate a bubble user interface element to receive the recipient identifier and actionable tag content.

In Example 22, the subject matter of Examples 13-21 includes, instructions that, when executed by the at least one processor, cause the at least one processor to perform operations to: receive personalization configuration information via the user interface; and process the actionable tag using the personalization configuration information.

In Example 23, the subject matter of Example 22 wherein, the personalization configuration information includes an alias for the actionable tag indicator and further comprising instructions that, when executed by the at least one processor, cause the at least one processor to perform operations to identify the actionable tag indicator using the alias.

In Example 24, the subject matter of Examples 13-23 wherein, the actionable tag is a personal message actionable tag, a recipient removal actionable tag, a meeting request actionable tag, a reminder actionable tag, a translation actionable tag, or a task actionable tag.

Example 25 is a method for multiple message composition using actionable tags. Message content is received from a user interface. An actionable tag indicator is identified by a parser by parsing a body of the message content. The actionable tags are identified in-line with the message content reducing computing cycles from additional menu or application feature activations. An actionable tag is generated based on the identified actionable tag indicator. The generated actionable tag includes the actionable tag indicator, a recipient identifier, and content. A first message is automatically composed that includes the message content. A second message is automatically composed that includes the message content and the actionable tag. The first message is transmitted to at least one recipient and the second message is transmitted to a tagged recipient associated with the recipient identifier corresponding to the actionable tag. Storage utilization is reduced by transmitting one message to each recipient that includes tagged content in contrast to conventional techniques that use multiple messages to transmit common content and personal content to a recipient reducing duplicated content. The method of example 25 also reduces mailbox clutter and overlooked action items by presenting action items in the actionable tag to alert a tagged recipient of the individualized content.

In Example 26, the subject matter of Example 25 wherein, the actionable tag indicator indicates that the actionable tag is a private message actionable tag and further comprising: determining that the tagged recipient is not in a recipient list that includes the at least one recipient; adding the tagged recipient to the recipient list; generating a recipient addition notification; and transmitting the recipient addition notification to recipients of the recipient list.

In Example 27, the subject matter of Examples 25-26 wherein, the actionable tag indicator indicates that the actionable tag is a recipient removal actionable tag and further comprising: generating a recipient removal notification including the recipient identifier and a sender identifier; transmitting the recipient removal notification to the at least one recipient; and removing the tagged recipient from a recipient list.

In Example 28, the subject matter of Examples 25-27 includes, identifying a previous actionable tag in the body of the message content; determining that previous action has been initiated for the previous actionable tag; and including the previous actionable tag in the message content without initiating an action.

In Example 29, the subject matter of Examples 25-28 includes, presenting a tag modification control in the message messaging client user interface in correspondence with the actionable tag, wherein the tag modification control includes a deletion control; and upon selection of the deletion control, removing the actionable tag from the message content.

In Example 30, the subject matter of Examples 25-29 wherein, the actionable tag includes private content to be delivered to the tagged recipient in the second message without transmission to the at least one recipient in the first message.

In Example 31, the subject matter of Example 30 wherein, the private content is identified by a private content start indicator and a private content end indicator identified in the body of the message content in association with the actionable tag.

In Example 32, the subject matter of Example 31 wherein, the private content start indicator and the private content end indicator is a character pair or a beginning and end of a text array.

In Example 33, the subject matter of Examples 25-32 wherein, generating the actionable tag includes generating a bubble user interface element to receive the recipient identifier and actionable tag content.

In Example 34, the subject matter of Examples 25-33 includes, receiving personalization configuration information via the user interface; and processing the actionable tag using the personalization configuration information.

In Example 35, the subject matter of Example 34 wherein, the personalization configuration information includes an alias for the actionable tag indicator and further comprising identifying the actionable tag indicator using the alias.

In Example 36, the subject matter of Examples 25-35 wherein, the actionable tag is a personal message actionable tag, a recipient removal actionable tag, a meeting request actionable tag, a reminder actionable tag, a translation actionable tag, or a task actionable tag.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for multiple message composition using actionable tags comprising:
    at least one processor; and
    memory including instructions that, when executed by the at least one processor, cause the at least one processor to perform operations to:
        receive message content from a user interface;
        identify an actionable tag indicator by parsing a body of the message content;
        generate an actionable tag based on the identified actionable tag indicator, the generated actionable tag including the actionable tag indicator, a recipient identifier, and content;
        automatically compose a first message that includes the message content;
        automatically compose a second message that includes the message content and the actionable tag; and
        transmit the first message to at least one recipient and the second message to a tagged recipient associated with the recipient identifier corresponding to the actionable tag.

2. The system of claim 1, wherein the actionable tag indicator indicates that the actionable tag is a private message actionable tag and the memory further comprising instructions that, when executed by the at least one processor, cause the at least one processor to perform operations to:
    determine that the tagged recipient is not in a recipient list that includes the at least one recipient;
    add the tagged recipient to the recipient list;
    generate a recipient addition notification; and
    transmit the recipient addition notification to recipients of the recipients list.

3. The system of claim 1, wherein the actionable tag indicator indicates that the actionable tag is a recipient removal actionable tag and the memory further comprising instructions that, when executed by the at least one processor, cause the at least one processor to perform operations to:
    generate a recipient removal notification including the recipient identifier and a sender identifier;
    transmit the recipient removal notification to the at least one recipient; and
    remove the tagged recipient from a recipient list.

4. The system of claim 1, the memory further comprising instructions that, when executed by the at least one processor, cause the at least one processor to perform operations to:
    identify a previous actionable tag in the body of the message content;
    determine that previous action has been initiated for the previous actionable tag; and
    include the previous actionable tag in the message content without initiating an action.

5. The system of claim 1, the memory further comprising that, when executed by the at least one processor, cause the at least one processor to perform operations to:
    present a tag modification control in the message messaging client user interface in correspondence with the actionable tag, wherein the tag modification control includes a deletion control; and
    upon selection of the deletion control, remove the actionable tag from the message content.

6. The system of claim 1, wherein the actionable tag includes private content to be delivered to the tagged recipient in the second message without transmission to the at least one recipient in the first message.

7. The system of claim 1 wherein the actionable tag is a personal message actionable tag, a recipient removal actionable tag, a meeting request actionable tag, a reminder actionable tag, a translation actionable tag, or a task actionable tag.

8. At least one non-transitory machine-readable medium including instructions for multiple message composition using actionable tags that, when executed by at least one processor, cause the at least one processor to perform operations to:
    receive message content from a user interface;
    identify an actionable tag indicator by parsing a body of the message content;
    generate an actionable tag based on the identified actionable tag indicator, the generated actionable tag including the actionable tag indicator, a recipient identifier, and content;
    automatically compose a first message that includes the message content;
    automatically compose a second message that includes the message content and the actionable tag; and
    transmit the first message to at least one recipient and the second message to a tagged recipient associated with the recipient identifier corresponding to the actionable tag.

9. The at least one non-transitory machine-readable medium of claim 8, wherein the actionable tag indicator indicates that the actionable tag is a private message actionable tag and further comprising instructions that, when executed by the at least one processor, cause the at least one processor to perform operations to:
    determine that the tagged recipient is not in a recipient list that includes the at least one recipient;
    add the tagged recipient to the recipient list;
    generate a recipient addition notification; and
    transmit the recipient addition notification to recipients of the recipient list.

10. The at least one non-transitory machine-readable medium of claim 8, wherein the actionable tag indicator indicates that the actionable tag is a recipient removal actionable tag and further comprising instructions that, when executed by the at least one processor, cause the at least one processor to perform operations to:
    generate a recipient removal notification including the recipient identifier and a sender identifier;
    transmit the recipient removal notification to the at least one recipient; and
    remove the tagged recipient from a recipient list.

11. The at least one non-transitory machine-readable medium of claim 8, further comprising instructions that, when executed by the at least one processor, cause the at least one processor to perform operations to:
    identify a previous actionable tag in the body of the message content;
    determine that previous action has been initiated for the previous actionable tag; and
    include the previous actionable tag in the message content without initiating an action.

12. The at least one non-transitory machine-readable medium of claim 8, further comprising that, when executed by the at least one processor, cause the at least one processor to perform operations to:
    present a tag modification control in the message messaging client user interface in correspondence with the actionable tag, wherein the tag modification control includes a deletion control; and upon selection of the deletion control, remove the actionable tag from the message content.

13. The at least one non-transitory machine-readable medium of claim 8, wherein the actionable tag includes private content to be delivered to the tagged recipient in the second message without transmission to the at least one recipient in the first message.

14. The at least one non-transitory machine-readable medium of claim 8 wherein the actionable tag is a personal message actionable tag, a recipient removal actionable tag, a meeting request actionable tag, a reminder actionable tag, a translation actionable tag, or a task actionable tag.

15. A method for multiple message composition using actionable tags comprising:
   receiving message content from a user interface;
   identifying an actionable tag indicator by parsing a body of the message content;
   generating an actionable tag based on the identified actionable tag indicator, the generated actionable tag including the actionable tag indicator, a recipient identifier, and content;
   automatically composing a first message that includes the message content;
   automatically composing a second message that includes the message content and the actionable tag; and
   transmitting the first message to at least one recipient and the second message to a tagged recipient associated with the recipient identifier corresponding to the actionable tag.

16. The method of claim 15, wherein the actionable tag indicator indicates that the actionable tag is a private message actionable tag and further comprising:
   determining that the tagged recipient is not in a recipient list that includes the at least one recipient;
   adding the tagged recipient to the recipient list;
   generating a recipient addition notification; and
   transmitting the recipient addition notification to recipients of the recipient list.

17. The method of claim 15, wherein the actionable tag indicator indicates that the actionable tag is a recipient removal actionable tag and further comprising:
   generating a recipient removal notification including the recipient identifier and a sender identifier;
   transmitting the recipient removal notification to the at least one recipient; and
   removing the tagged recipient from a recipient list.

18. The method of claim 15, further comprising:
   identifying a previous actionable tag in the body of the message content;
   determining that previous action has been initiated for the previous actionable tag; and
   including the previous actionable tag in the message content without initiating an action.

19. The method of claim 15, further comprising:
   presenting a tag modification control in the message messaging client user interface in correspondence with the actionable tag, wherein the tag modification control includes a deletion control; and
   upon selection of the deletion control, removing the actionable tag from the message content.

20. The method of claim 15, wherein the actionable tag includes private content to be delivered to the tagged recipient in the second message without transmission to the at least one recipient in the first message.

\* \* \* \* \*